(12) United States Patent
Masputra et al.

(10) Patent No.: US 11,159,651 B2
(45) Date of Patent: Oct. 26, 2021

(54) METHODS AND APPARATUS FOR MEMORY ALLOCATION AND REALLOCATION IN NETWORKING STACK INFRASTRUCTURES

(71) Applicant: Apple Inc., Cupertino, CA (US)

(72) Inventors: Cahya Adiansyah Masputra, Cupertino, CA (US); Delziel Jude Fernandes, Cupertino, CA (US); Darrin Jewell, Cupertino, CA (US); Sandeep Nair, Cupertino, CA (US); Wei Shen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/368,338

(22) Filed: Mar. 28, 2019

(65) Prior Publication Data

US 2019/0303205 A1    Oct. 3, 2019

Related U.S. Application Data

(60) Provisional application No. 62/649,509, filed on Mar. 28, 2018.

(51) Int. Cl.
*G06F 9/455* (2018.01)
*H04L 29/06* (2006.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC ........ G06F 9/50; G06F 9/5005; G06F 9/5016; G06F 9/52; G06F 9/545; G06F 2212/65;
(Continued)

(56) References Cited

U.S. PATENT DOCUMENTS 5,367,688 A    11/1994 Croll
6,032,179 A    2/2000 Osborne
(Continued)

OTHER PUBLICATIONS

Moon-Sang Lee, Joonwon Lee and S. Maeng, "Context-aware address translation for high performance SMP cluster system," 2008 IEEE International Conference on Cluster Computing, Tsukuba, 2008, pp. 292-297, doi: 10.1109/CLUSTR.2008.4663784. (Year: 2008).*

*Primary Examiner* — Khoa D Doan
(74) *Attorney, Agent, or Firm* — Sterne, Kessler, Goldstein & Fox P.L.L.C.

(57) ABSTRACT

Methods and apparatus for memory allocation and reallocation in networking stack infrastructures. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. A user space networking stack is disclosed that enables extensible, cross-platform-capable, user space control of the networking protocol stack functionality. The user space networking stack facilitates tighter integration between the protocol layers (including TLS) and the application or daemon. Exemplary systems can support multiple networking protocol stack instances (including an in-kernel traditional network stack). Due to this disclosed architecture, physical memory allocations (and deallocations) may be more flexibly implemented.

20 Claims, 16 Drawing Sheets

(51) Int. Cl.

| | |
|---|---|
| H04L 12/46 | (2006.01) |
| G06F 9/54 | (2006.01) |
| G06F 9/48 | (2006.01) |
| G06F 9/50 | (2006.01) |
| G06F 12/10 | (2016.01) |
| G06F 13/16 | (2006.01) |
| G06F 3/06 | (2006.01) |
| G06F 9/46 | (2006.01) |
| G06F 12/02 | (2006.01) |
| H04L 12/859 | (2013.01) |
| H04L 12/851 | (2013.01) |
| H04L 12/863 | (2013.01) |
| H04L 12/935 | (2013.01) |
| H04L 12/861 | (2013.01) |
| H04L 12/801 | (2013.01) |
| H04L 12/841 | (2013.01) |
| G06F 9/52 | (2006.01) |
| H04L 12/26 | (2006.01) |
| G06F 16/23 | (2019.01) |
| G06F 21/52 | (2013.01) |
| H04L 12/833 | (2013.01) |
| H04L 12/835 | (2013.01) |
| H04L 12/823 | (2013.01) |
| H04L 12/865 | (2013.01) |
| G06F 21/56 | (2013.01) |
| G06F 16/22 | (2019.01) |
| H04L 29/12 | (2006.01) |
| H04L 29/08 | (2006.01) |
| H04L 1/00 | (2006.01) |

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(58) Field of Classification Search
CPC ............ G06F 2212/657; G06F 12/123; G06F 12/0246; G06F 12/0811; G06F 12/0817; G06F 12/084
See application file for complete search history.

(56) References Cited

U.S. PATENT DOCUMENTS

| | | | |
|---|---|---|---|
| 6,349,355 B1 * | 2/2002 | Draves | G06F 9/4843 |
| | | | 711/6 |
| 7,100,020 B1 | 8/2006 | Brightman et al. | |
| 7,152,231 B1 | 12/2006 | Galluscio et al. | |
| 7,398,382 B2 | 7/2008 | Rothman et al. | |
| 7,403,542 B1 | 7/2008 | Thompson | |
| 7,506,084 B2 | 3/2009 | Moerti et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,941,682 B2 | 5/2011 | Adams | |
| 8,214,707 B2 | 7/2012 | Munson et al. | |
| 8,230,248 B2 | 7/2012 | Dance et al. | |
| 8,255,725 B2 | 8/2012 | Shimazaki et al. | |
| 8,352,624 B2 | 1/2013 | Zimmerman et al. | |
| 8,555,099 B2 | 10/2013 | Marinkovic et al. | |
| 8,769,168 B2 | 7/2014 | Moertl et al. | |
| 9,049,179 B2 | 6/2015 | Luna | |
| 9,170,957 B2 | 10/2015 | Touzni et al. | |
| 9,280,360 B2 | 3/2016 | Xu et al. | |
| 9,594,718 B2 | 3/2017 | Kaushik et al. | |
| 9,959,124 B1 | 5/2018 | Herbeck et al. | |
| 10,078,361 B2 | 9/2018 | Sanghi et al. | |
| 10,289,555 B1 * | 5/2019 | Michaud | G06F 12/109 |
| 10,331,600 B1 | 6/2019 | Rajadnya et al. | |
| 2001/0037410 A1 | 11/2001 | Gardner | |
| 2002/0053011 A1 | 5/2002 | Aiken et al. | |
| 2002/0169938 A1 | 11/2002 | Scott et al. | |
| 2003/0061395 A1 | 3/2003 | Kingsbury et al. | |
| 2004/0010473 A1 | 1/2004 | Hsu et al. | |
| 2004/0010545 A1 | 1/2004 | Pandya | |
| 2005/0278498 A1 * | 12/2005 | Ahluwalia | G06F 12/023 |
| | | | 711/170 |
| 2006/0075119 A1 | 4/2006 | Hussain | |
| 2006/0136570 A1 | 6/2006 | Pandya | |
| 2007/0183418 A1 * | 8/2007 | Riddoch | H04L 49/90 |
| | | | 370/389 |
| 2007/0226375 A1 | 9/2007 | Chu et al. | |
| 2007/0255802 A1 | 11/2007 | Aloni | |
| 2008/0005794 A1 | 1/2008 | Inoue et al. | |
| 2008/0127292 A1 | 5/2008 | Cooper et al. | |
| 2008/0148291 A1 | 6/2008 | Huang et al. | |
| 2009/0240874 A1 | 9/2009 | Pong | |
| 2009/0265723 A1 * | 10/2009 | Mochizuki | G06F 9/485 |
| | | | 719/328 |
| 2010/0005014 A1 | 1/2010 | Castle et al. | |
| 2010/0017655 A1 | 1/2010 | Gooding et al. | |
| 2010/0049876 A1 | 2/2010 | Pope et al. | |
| 2010/0118041 A1 | 5/2010 | Chen et al. | |
| 2011/0035575 A1 | 2/2011 | Kwon et al. | |
| 2011/0083002 A1 | 4/2011 | Albers et al. | |
| 2011/0161619 A1 * | 6/2011 | Kaminski | G06F 9/5016 |
| | | | 711/207 |
| 2011/0219208 A1 | 9/2011 | Asaad et al. | |
| 2011/0246742 A1 | 10/2011 | Kogen et al. | |
| 2012/0036334 A1 | 2/2012 | Horman et al. | |
| 2012/0260017 A1 | 10/2012 | Mine et al. | |
| 2013/0067188 A1 | 3/2013 | Mehra et al. | |
| 2013/0204927 A1 | 8/2013 | Kruglikov et al. | |
| 2013/0205113 A1 | 8/2013 | Ahmad et al. | |
| 2013/0275976 A1 | 10/2013 | Dawson et al. | |
| 2014/0068624 A1 | 3/2014 | Fuller et al. | |
| 2014/0189057 A1 | 7/2014 | Sankoda et al. | |
| 2014/0355606 A1 | 12/2014 | Riddoch et al. | |
| 2015/0081985 A1 | 3/2015 | Archer et al. | |
| 2015/0261588 A1 | 9/2015 | Liu et al. | |
| 2015/0363110 A1 | 12/2015 | Batra et al. | |
| 2016/0103480 A1 | 4/2016 | Sanghi et al. | |
| 2016/0231929 A1 * | 8/2016 | Tsirkin | G06F 12/08 |
| 2016/0357443 A1 | 12/2016 | Li et al. | |
| 2017/0003977 A1 * | 1/2017 | Sumida | G06F 9/45558 |
| 2017/0003997 A1 * | 1/2017 | Kelly | G06F 9/45558 |
| 2017/0075856 A1 | 3/2017 | Suzue et al. | |
| 2017/0111283 A1 | 4/2017 | Kumar et al. | |

(56) References Cited

U.S. PATENT DOCUMENTS

| | | |
|---|---|---|
| 2017/0147282 A1 | 5/2017 | Seo |
| 2017/0149890 A1 | 5/2017 | Shamis |
| 2017/0187621 A1 | 6/2017 | Shalev et al. |
| 2017/0264497 A1 | 9/2017 | Lim |
| 2017/0286322 A1 | 10/2017 | Garg et al. |
| 2017/0337588 A1 | 11/2017 | Chittilappilly et al. |
| 2017/0371591 A1 | 12/2017 | Xia et al. |
| 2018/0004690 A1 | 1/2018 | Kaminski et al. |
| 2018/0173643 A1* | 6/2018 | Yu ................ G06F 12/0246 |
| 2018/0295052 A1 | 10/2018 | St-Laurent |
| 2019/0036893 A1 | 1/2019 | Jiang |
| 2019/0097938 A1 | 3/2019 | Talla et al. |
| 2019/0213044 A1 | 7/2019 | Cui et al. |
| 2019/0253351 A1 | 8/2019 | Ihlar et al. |
| 2019/0303204 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0065244 A1 | 2/2020 | Sanghi et al. |

* cited by examiner

METHODS AND APPARATUS FOR MEMORY ALLOCATION AND REALLOCATION IN NETWORKING STACK INFRASTRUCTURES

PRIORITY

This application claims the benefit of priority to U.S. Provisional Patent Application Ser. No. 62/649,509 filed Mar. 28, 2018 and entitled "METHODS AND APPARATUS FOR EFFICIENT DATA TRANSFER WITHIN USER SPACE NETWORKING STACK INFRASTRUCTURES", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", U.S. patent application Ser. No. 16/365,462 filed Mar. 26, 2019 and entitled "Methods and Apparatus for Sharing and Arbitration of Host Stack Information with User Space Communication Stacks", U.S. patent application Ser. No. 16/365,484 filed Mar. 26, 2019 and entitled "Methods and Apparatus for Virtualized Hardware Optimizations for User Space Networking", U.S. patent application Ser. No. 16/368,396 filed concurrently herewith on Mar. 28, 2019 and entitled "Methods and Apparatus for Secure Operation of User Space Communication Stacks", U.S. patent application Ser. No. 16/368,368 filed concurrently herewith on Mar. 28, 2019 and entitled "Methods and Apparatus for Active Queue Management in User Space Networking", and U.S. patent application Ser. No. 16/368,214 filed concurrently herewith on Mar. 28, 2019 and entitled "Methods and Apparatus for Self-Tuning Operation within User Space Stack Architectures", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. DESCRIPTION OF RELATED TECHNOLOGY

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a system for managing pools of resources is disclosed. In one embodiment, the system includes one or more processor apparatus; one or more applications executable by the one or more processor apparatus; physical memory for use by the one or more applications; and an input/output memory management unit (IOMMU) for use by the one or more applications, the IOMMU configured to access a kernel virtual address (KVA), the KVA providing for translation of a virtual address accessed by the one or more applications to a physical address associated with the physical memory. The one or more processor apparatus are configured to: allocate a virtual address space to one of the one or more applications; associate the virtual address space with a portion of the physical memory via use of the IOMMU; and de-allocate a subset of the portion of the physical memory associated with the virtual address space.

In one variant, the virtual address space includes an arena, the arena includes a plurality of regions, each of the plurality of regions includes a plurality of segments, each of the segments includes a plurality of objects.

In another variant, the deallocated subset of the portion of the physical memory is associated with a first segment of the plurality of segments.

In yet another variant, the deallocation occurs in accordance with a deferred context, and the deferred context includes an expiration of a timer.

In yet another variant, the deallocation occurs in accordance with a deferred context, and the deferred context includes a context switch between user space and kernel space.

In yet another variant, the deallocation of the subset of the portion of the physical memory occurs responsive to signaling from a user process to a kernel process.

In yet another variant, the signaling from the user process to the kernel process is indicative that the one of the one or more applications is in an active state, the active state associated with an active threshold value.

In yet another variant, the signaling from the user process to the kernel process is indicative that the one of the one or more applications is in an inactive state, the inactive state associated with an inactive threshold value, the inactive threshold value being lower than the active threshold value.

In yet another variant, the one or more processor apparatus are further configured to place the one of the one or more applications from a foreground process to a background process; receive control plane packet data, the received control plane packet data including control plane header data and control plane payload data; replace the control plane payload data with null data; and copy the null data and the control plane header data into heap memory.

In yet another variant, the one or more processor apparatus are further configured to read the null data and the control plane header data in the heap memory; and resume network connectivity for the one of the one or more applications.

In another aspect, methods and apparatus for requesting a channel schema for an application is disclosed. In one embodiment, the method includes requesting the channel schema for the application; and assigning a plurality of data structures associated with the requested channel schema, a portion of the plurality of data structures being configured in accordance with application requirements for the application.

In one variant, the assigning of the plurality of data structures includes assigning a transmission buffer having a first buffer size; and assigning a receive buffer having a second buffer size.

In another variant, the method further includes receiving a request for a different size for one or both of the first buffer size and the second buffer size.

In yet another variant, the receiving of the request for the different size for one or both of the first buffer size and the second buffer size includes increasing a data throughput for one or both of transmission buffer and the receive buffer.

In yet another variant, the receiving of the request for the different size for one or both of the first buffer size and the second buffer size includes decreasing an amount of latency for one or both of transmission buffer and the receive buffer.

In yet another variant, the method further includes mirroring the plurality of data structures between a user-accessible region and a kernel-only accessible region; and applying a common offset from a base address within the user-accessible region and the kernel-only accessible region for a metadata user object and a metadata kernel object associated with the metadata user object.

In yet another aspect, methods and apparatus for deallocating one or more physical memory pages from a kernel virtual address space is disclosed. In one embodiment, the method includes assigning the kernel virtual address space to an application; backing the kernel virtual address space with physical memory; determining that a portion of the kernel virtual address space is underutilized; and deallocating the portion of the kernel virtual address space that is underutilized from the physical memory.

In one variant, the deallocating of the portion of the kernel virtual address space that is underutilized from the physical memory includes compressing contents from the physical memory that is associated with the portion of the kernel virtual address space that is underutilized; and placing the compressed contents from the physical memory into a non-volatile memory storage device.

In another variant, the method further includes accessing the portion of the virtual address space that has been deallocated, the accessing including decompressing the compressed contents in the non-volatile memory storage device; and placing the decompressed contents in the non-volatile memory storage device into the physical memory.

In yet another variant, the placing of the decompressed contents in the non-volatile memory storage device into the physical memory includes placing the decompressed contents into another area of the physical memory, while the accessing of the portion of the virtual address space comprises using a same virtual address space addressing for the contents from the physical memory.

In yet another aspect, methods and apparatus for user pipe dynamic memory management using sync statistics are disclosed. In one embodiment, a user pipe process (e.g., Nexus) provides an efficient inter-processor communication (IPC) between user space processes using shared memory. Since the number of processes using IPC on an iOS device can be significant, an efficient mechanism is provided so as to keep the shared memory usage to minimum without compromising on the data throughput. In one variant, maintaining a fair estimate of immediate memory usage of user (working set) depending on the recent past usage is performed; the user pipe Nexus maintains a weighted moving average statistics of memory used during each synchronization, and can also keep adjusting the channel memory accordingly as needed.

In yet another aspect, methods and apparatus for purgeable memory (compressible and swappable) are disclosed. In one embodiment, the USNSI architecture allocates all memory as purgeable and wires memory on demand when needed.

In yet another aspect, methods and apparatus for memory region/arena: purpose, layout, access protection, sharing model are disclosed. In one embodiment, an efficient and generic mechanism to represent and manage the shared memory objects of varying types and sizes which are memory mapped to the user space and/or kernel space is disclosed. In one such embodiment, the USNSI architecture uses shared memory for efficient packet I/O, network statistics and system attributes (sysctl). USNSI arena is a generic and efficient mechanism to represent these various types of shared memory subsystems and their backing memory caches, regions and access protection attributes. Channel schema is a representation of the shared memory layout for user space process to be able to efficiently access various channel objects.

In yet another aspect, methods and apparatus for mirrored memory regions are disclosed. In one embodiment, to implement security validation and sanitation of shared memory objects on user-kernel boundary, a kernel-only copy of these objects is maintained, and an efficient method to allocate and retrieve these objects is provided. In one variant, mirrored memory object(s) is/are created, which share the same region offset as that of the associated object and hence can be retrieved quickly from the attributes of the associated object.

In yet another aspect, methods and apparatus for channeling defunct (map overrides) are disclosed. In one embodiment, networking memory associated with a process when it is backgrounded is freed; redirection of the shared memory mapping of the task so that they are backed with anonymous (zero-filled) pages is used to free the underlying memory. When the task is resumed, the user space shared memory accessor functions (e.g., libsyscall wrappers) have the logic to detect a defuncted state of the shared memory, and efficiently and effectively handle errors due to data inconsistencies.

In yet another aspect, methods and apparatus for conducting one or more "reaps" based on idleness are disclosed. In one embodiment, efficient and aggressive pruning and purging of idle resources are utilized via, inter alia, mechanisms which can detect idle resources and can offload pruning and purging of these resources in a deferred context.

In yet another aspect, methods and apparatus for management of daemon "jetsam" are disclosed. In one embodiment, a memory management module that keeps track of the memory consumed by the network protocols is provided; depending on memory usage, the module indicates to the system that active work is being performed by the protocols on behalf of the application. Once the buffers are returned to the memory management module, the module indicates to the system that the active work is complete. This prevents the system from targeting processes that consume more memory while doing active work.

In yet another aspect, methods and apparatus for TCP memory "defunct" management are disclosed. In one embodiment, data inconsistency issues when a channel is defunct during processing of TCP packet are avoided by use of a shadow copy of the original TCP header in heap memory. Once TCP processing begins, it uses the copy of the TCP header to make decisions which prevents any inconsistency or data corruption. The validation is done prior to handing off the payload data to the layer above TCP, as well as within the TCP input processing paths.

In yet another aspect, a computerized device implementing one or more of the foregoing aspects is disclosed and described. In one embodiment, the device includes a personal or laptop computer. In another embodiment, the device includes a mobile device (e.g., tablet or smartphone).

In yet another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed.

In yet another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device.

In yet another aspect, a software architecture is disclosed. In one embodiment, the architecture includes both user space and kernel space, separated via a software or virtual partition.

Other features and advantages of the present disclosure will immediately be recognized by persons of ordinary skill in the art with reference to the attached drawings and detailed description of exemplary embodiments as given below.

All figures © Copyright 2017-2019 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "METHODS AND APPARATUS FOR CONTROL OF A JOINTLY SHARED MEMORY-MAPPED REGION", each of which being incorporated herein by reference in its entirety, it will be recognized by those of ordinary skill that the present disclosure is not so limited.

Existing Network Socket Technologies—

Figure 1:
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
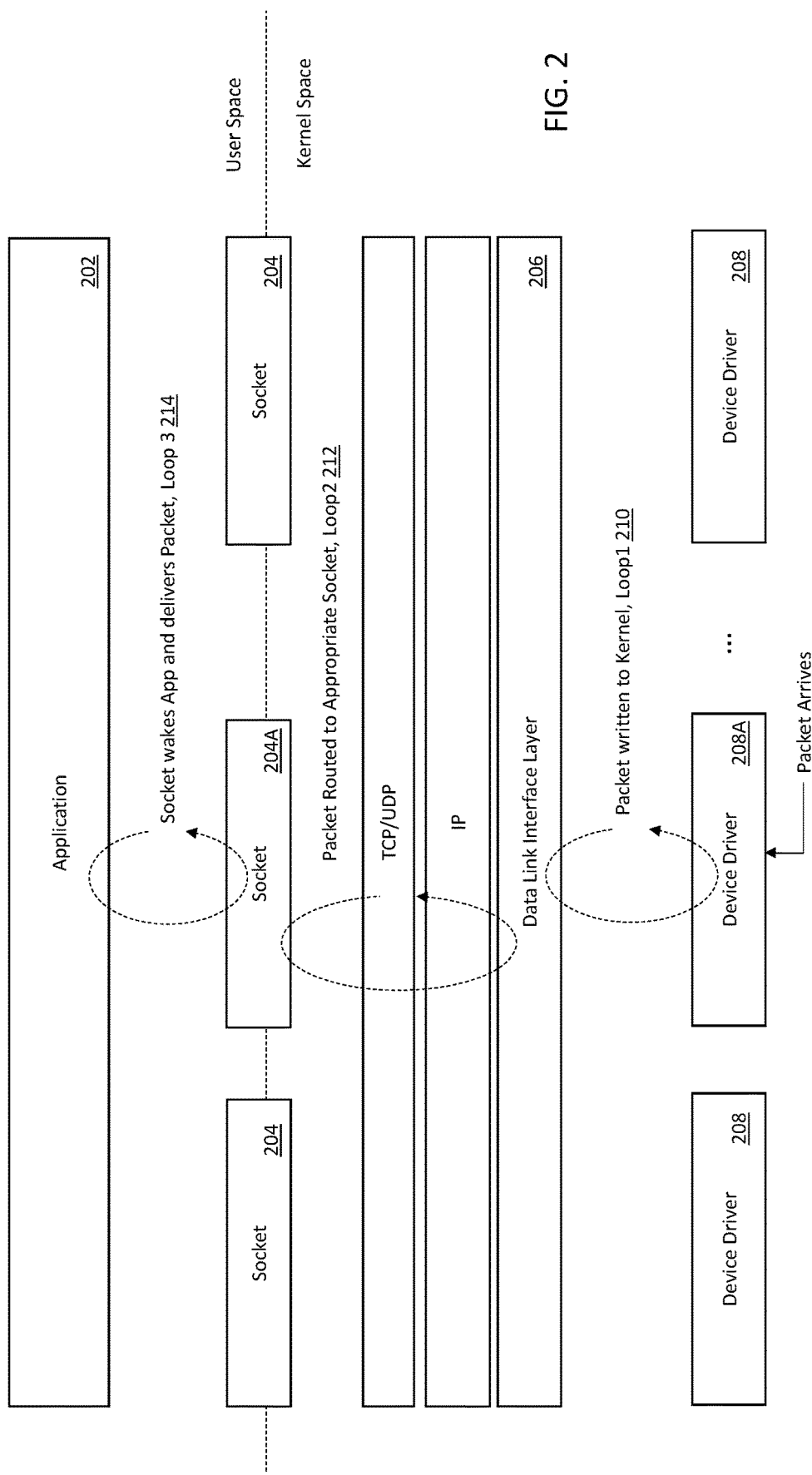
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases—

Figure 3:
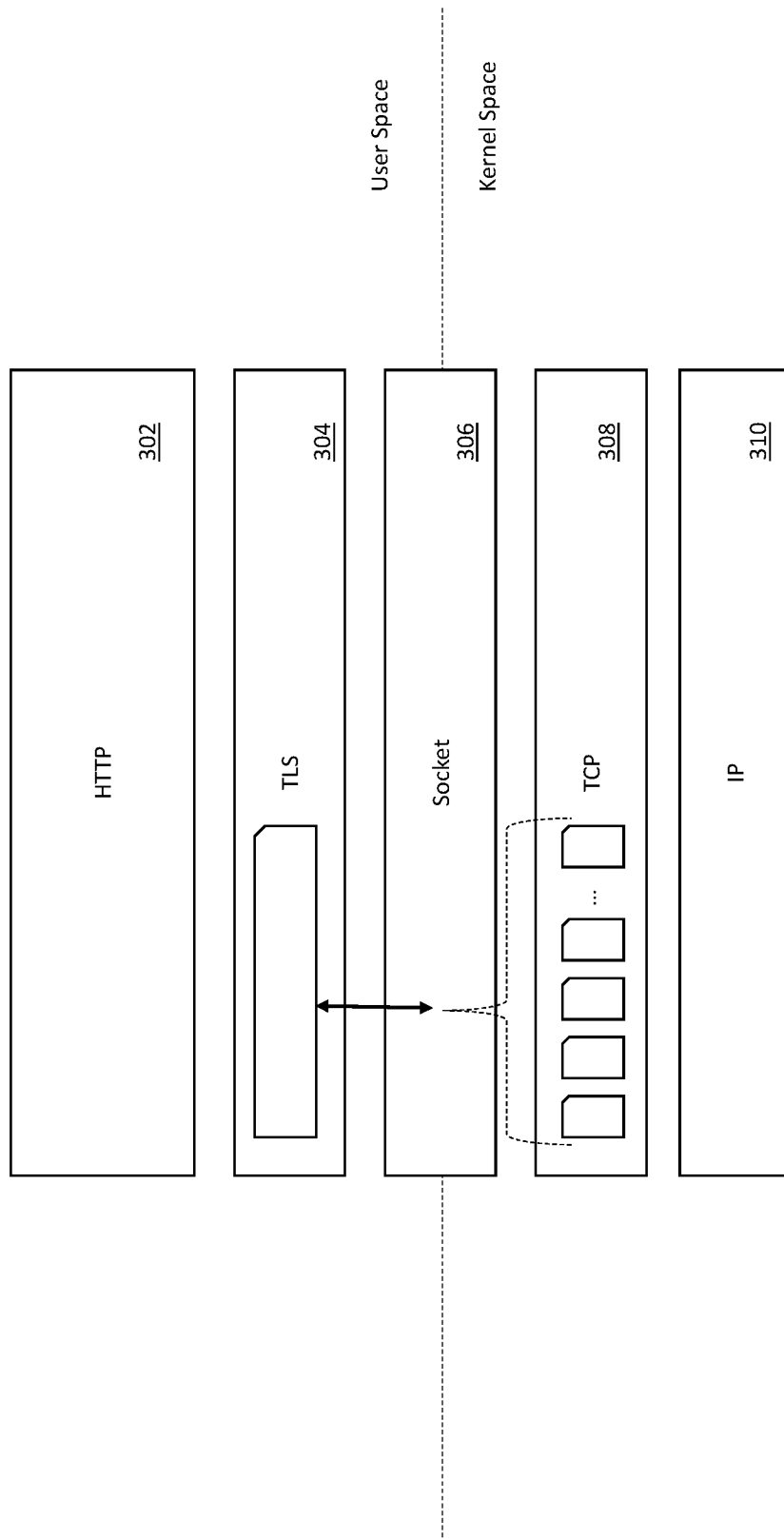
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
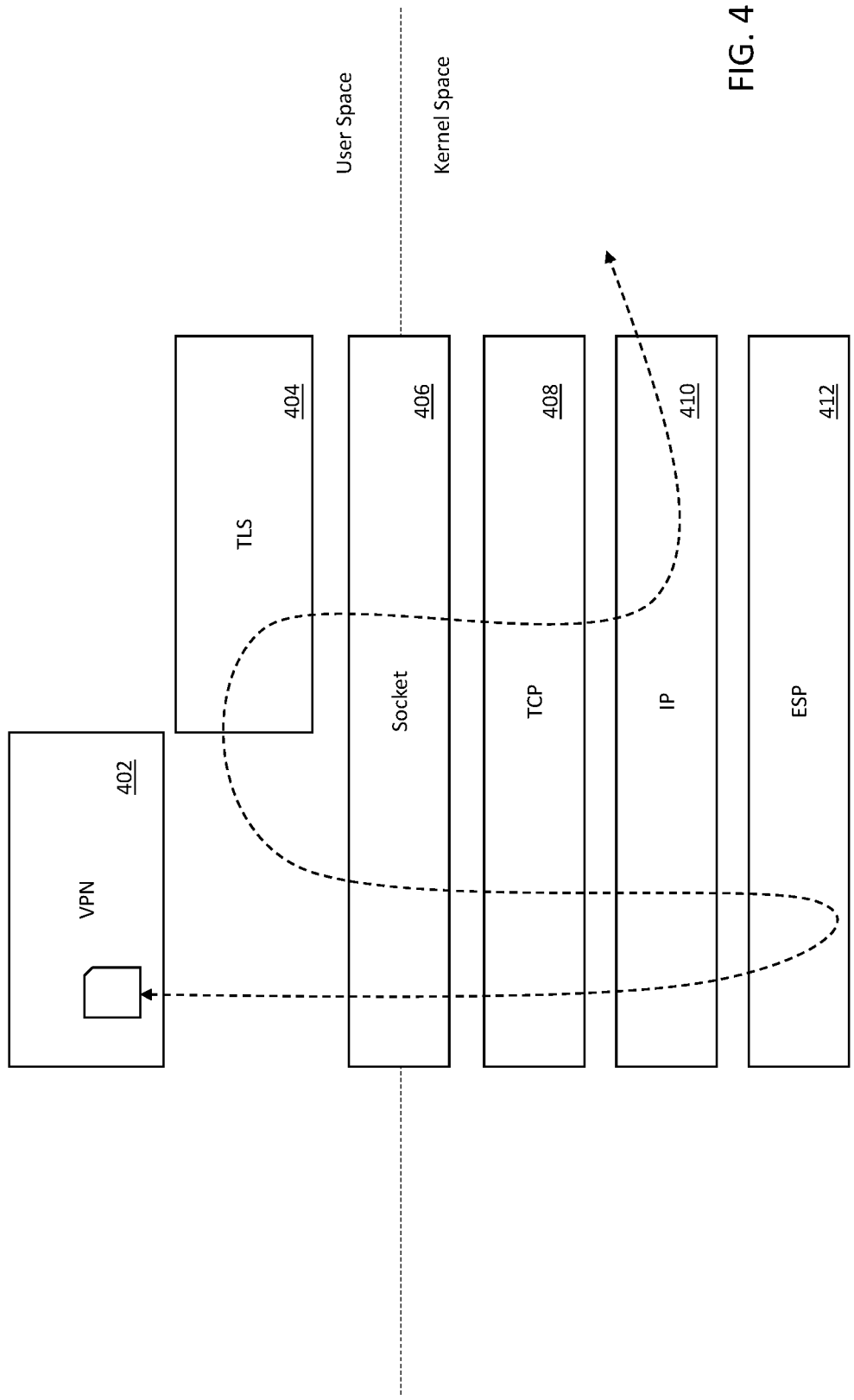
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
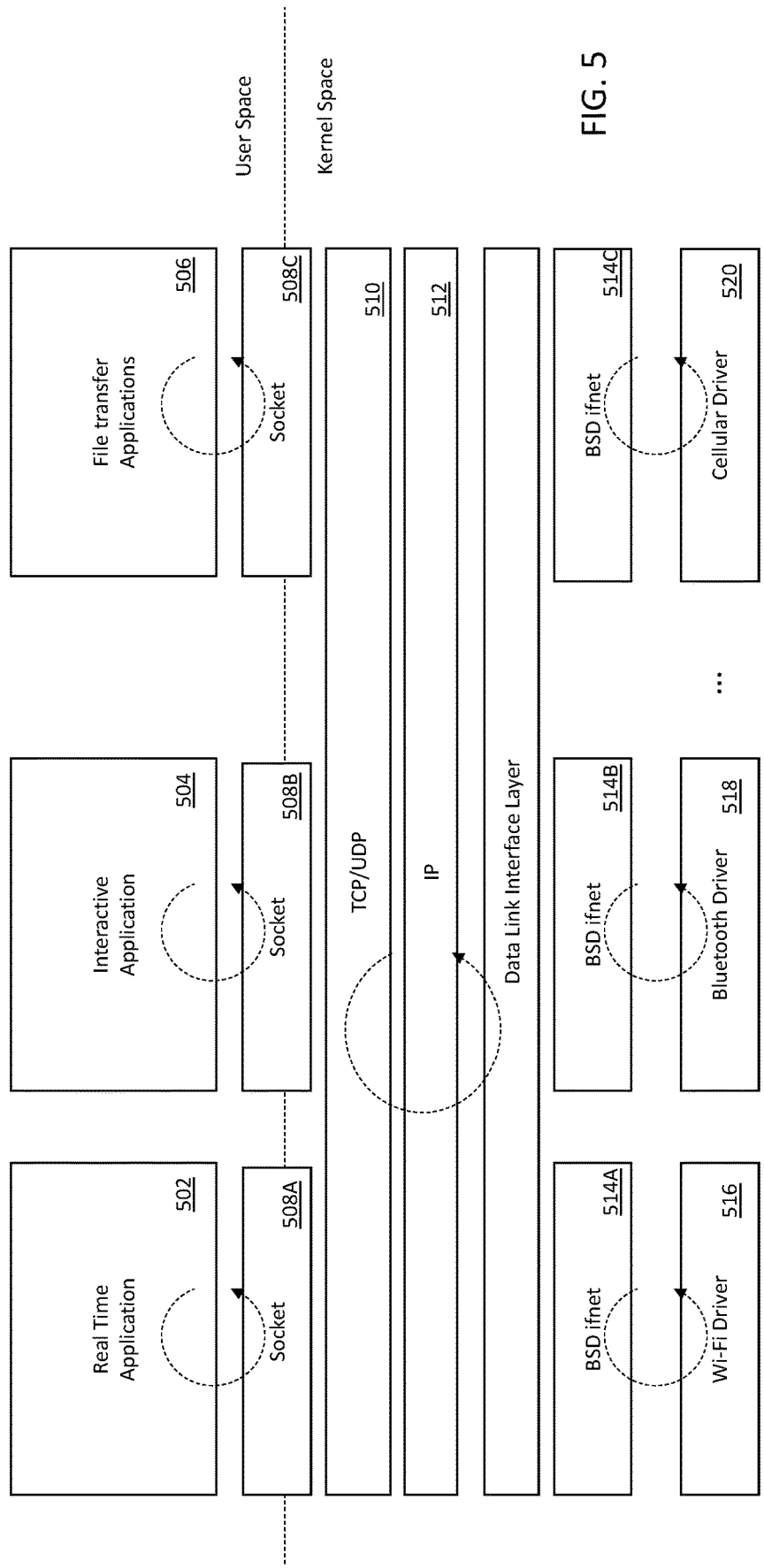
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
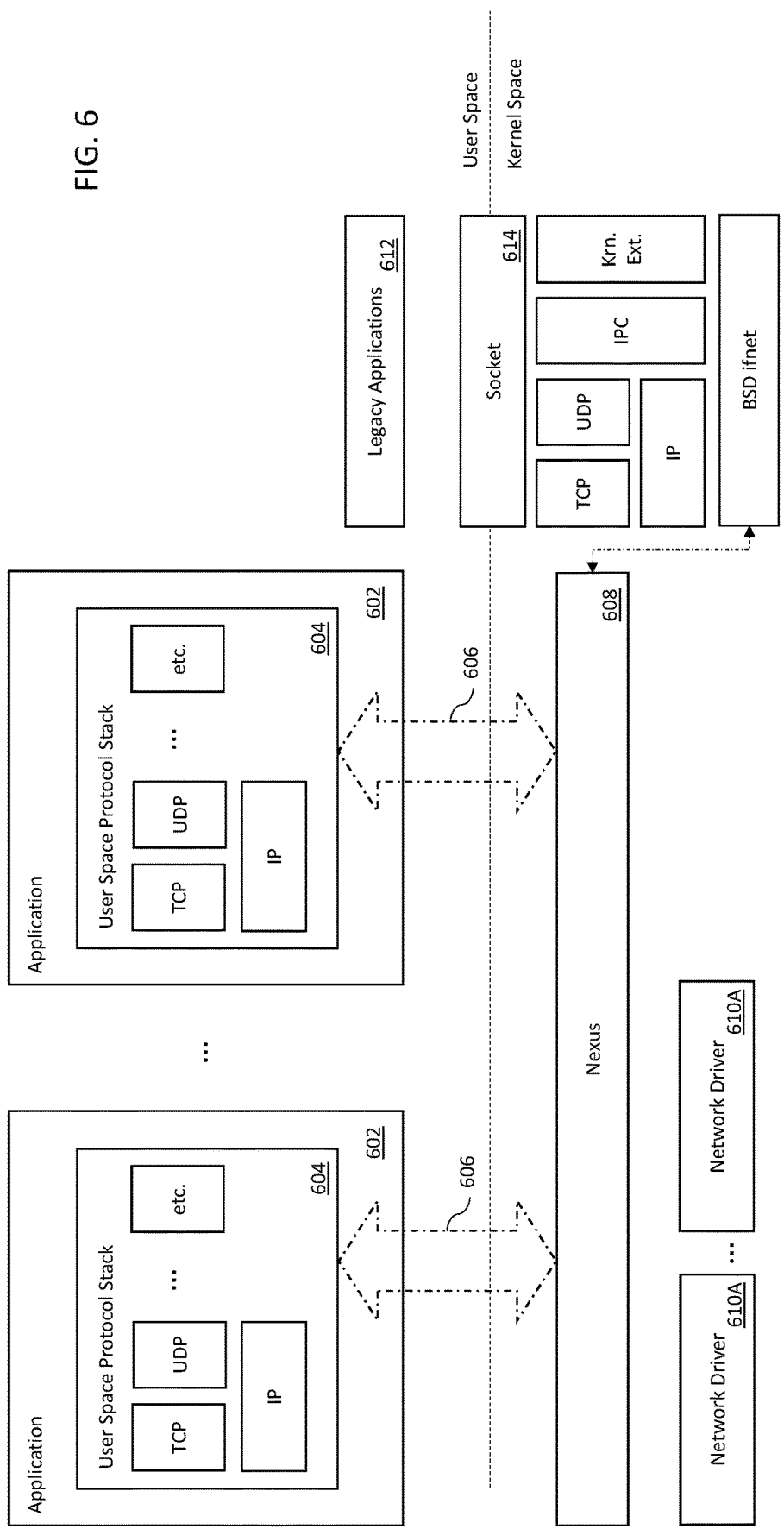
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure—

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space application networking stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Unloading Offloading, discussed infra).

Exemplary Network Extensions—

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations—

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading—

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack—

Figure 7:
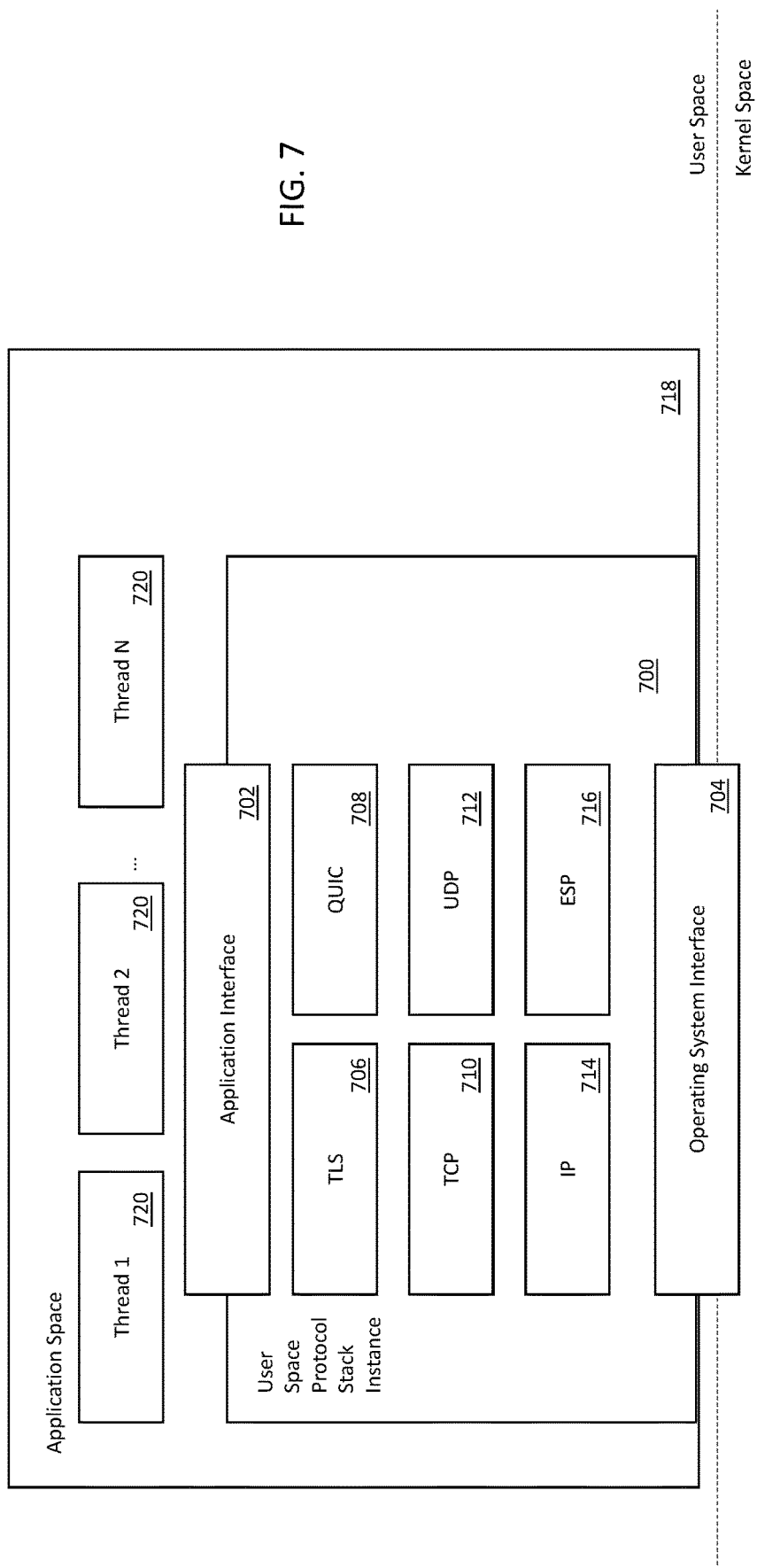
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation—

Figure 8:
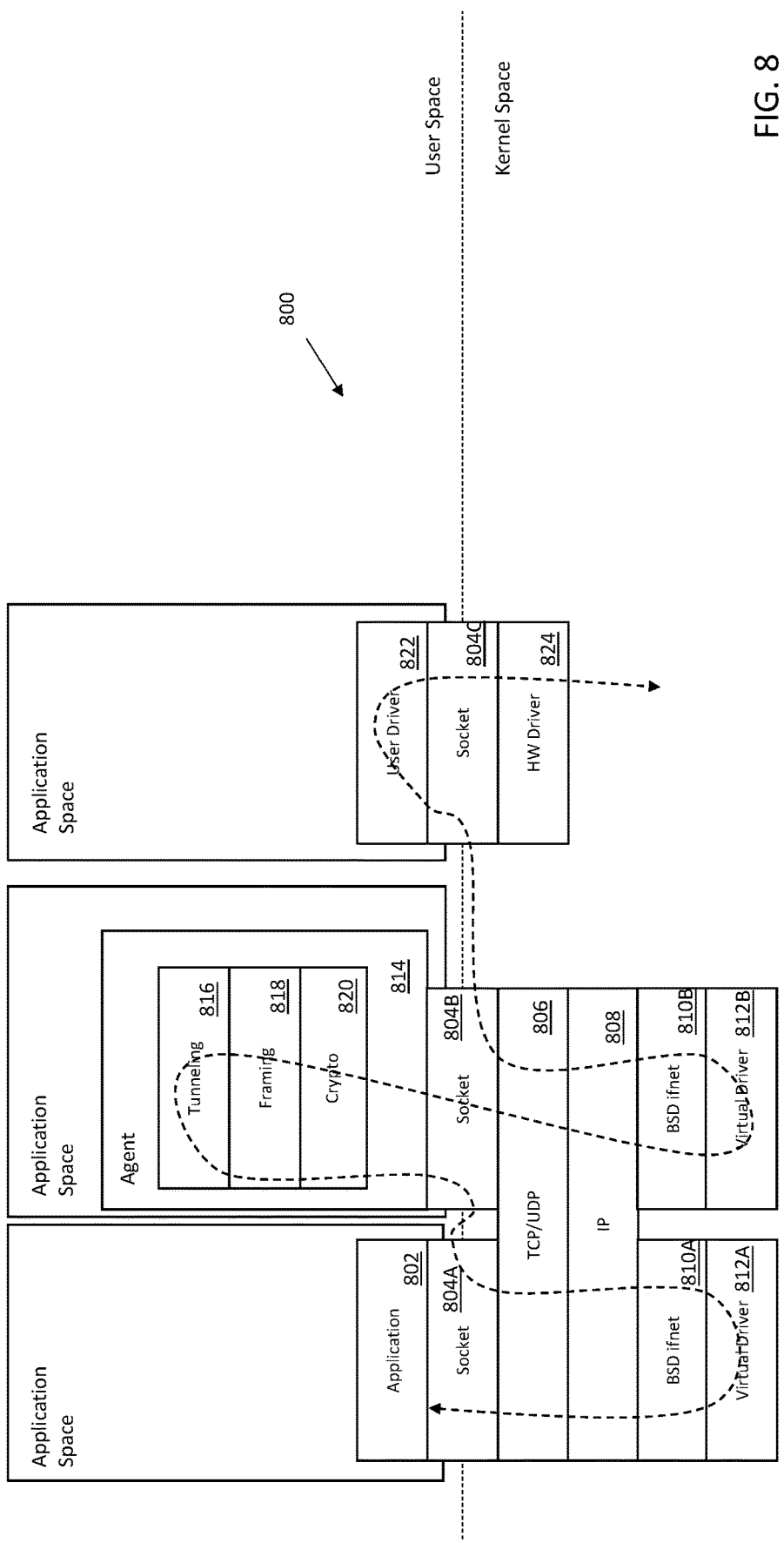
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
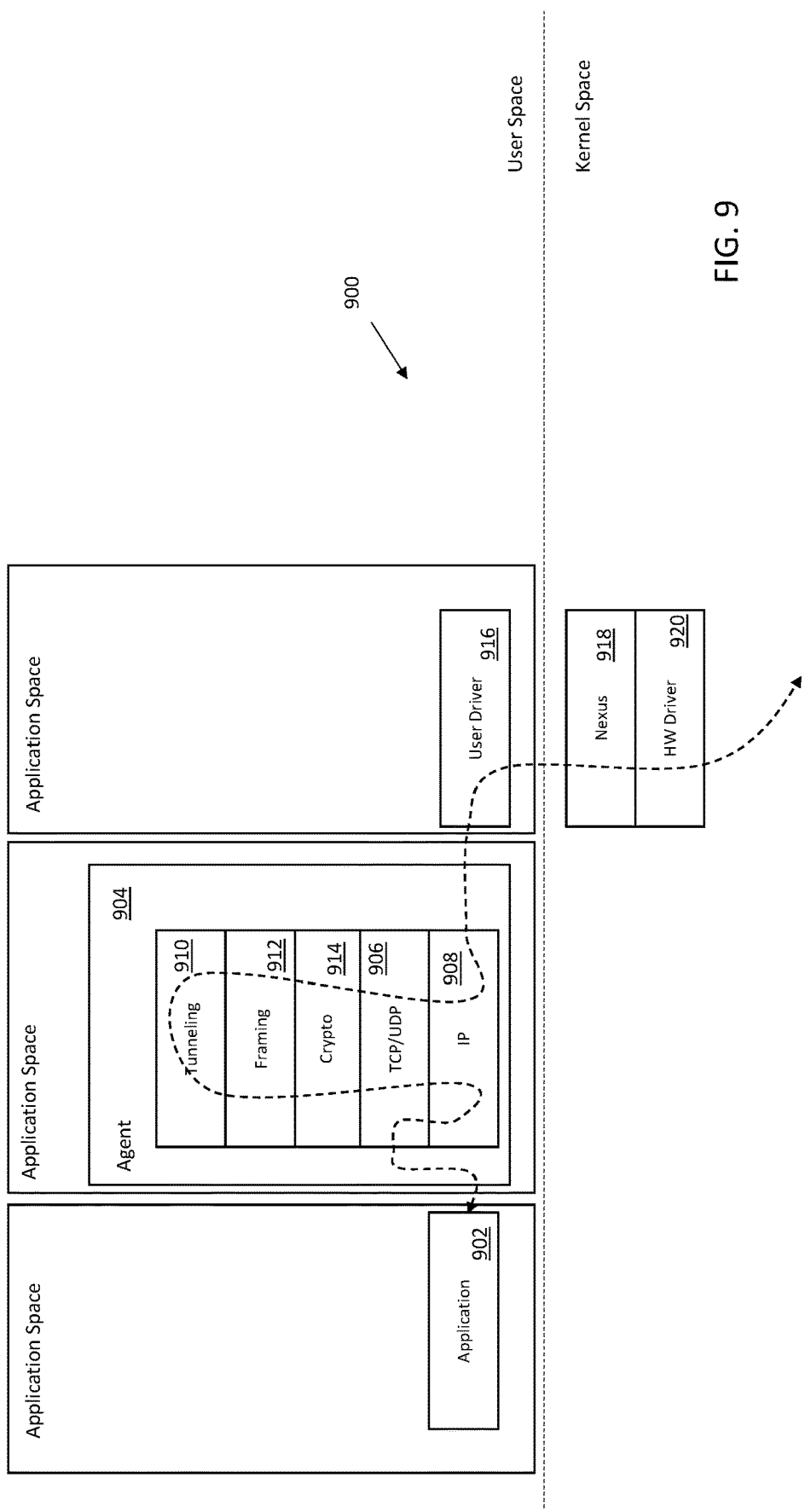
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Daemon Specific Considerations—

As used herein, the term "daemon" refers to a special process that runs within user space. Daemons run in the background and do not require any user interaction at all. Moreover, $3^{rd}$ party developers also do not have control and cannot create system daemons. Only the Assignee hereof can create daemons for its own systems; they are a special, privileged type of processes that $3^{rd}$ party developers cannot deploy. Daemons are never suspended, and are usually limited to a fixed memory allocation.

Under some circumstances, a networking daemon can accidentally leak memory or cause other problems. For reasons previously articulated above, identifying rogue threads in traditional networking stacks was unfeasible because existing monolithic networking stacks handled all network connections. However, within the context of the present disclosure, networking daemons are treated as a thread associated with the user space networking stack that called it (even though the daemon is not really a user process). Grouping daemons with their corresponding user space networking stack can greatly mitigate the impact of daemon errors and improve daemon recovery. In particular, the calling user space networking stack is responsible for tracking its memory usage in the daemons (the daemons are not shared with other processes); thus rogue daemons can be easily identified.

Unfortunately, user space daemons can be mistaken for runaway processes by the kernel because the kernel is not aware of user space daemon operation. Consequently, solutions for managing a user space daemon's background activities are needed.

Normally, in order to ensure that a daemon is correctly operating, the kernel sets a "high water mark" for a daemon's thread (an amount of data that a daemon cannot exceed during normal usage.) Subsequently, if the daemon's thread leaks memory, the process can be terminated and/or restarted.

Unfortunately, a simple "high water mark" can pose problems for networking daemons. In particular, networking daemon processes may be infrequently used, but consume a lot of memory during usage. For example, TCP packet handling usually queues packet buffers until the application is ready to consume the packets. Consequently, if the application does not read data for long periods of time (which is relatively common for a network daemon), or if the network sends a large batch of packets (e.g., TCP stores out-of-order segments in its reassembly queue until missing segments arrive), then the TCP flow could be associated with a large amount of memory. The TCP protocol in this case runs within the daemon, and the memory associated with the TCP flow increases the physical memory footprint of the daemon. This increased physical memory footprint could exceed a daemon's allowable high water mark. Consequently, the daemon could be wrongly targeted by the system for termination.

To these ends, various embodiments of the networking daemon stack include an efficient memory management module that keeps track of the memory consumed by the network protocols (e.g., TCP buffering) associated with the daemon. Depending on memory usage, the memory management module indicates to the kernel whether there is active work performed by the networking protocols on behalf of the application. Specifically, if the memory usage increases a certain threshold set by the memory management module, then the module indicates to the kernel that active work is being performed by the network protocols on behalf of the application. This lets the kernel know that the increased memory usage by the daemon is expected. Once the memory associated with the buffers has returned back to the memory management module, the module indicates to the system that the active work is complete. This prevents the system from prematurely targeting daemon processes that consume more memory while doing active work.

More generally, while the foregoing process is described within the context of a network daemon, artisans of ordinary skill in the related arts will readily appreciate, given the contents of the present disclosure, that substantially similar techniques could be used on other applications (e.g., slow responding or infrequent) and/or other protocols with longer queuing intervals.

As previously alluded to, user space networking stacks introduce a unique problem in the operation of daemons. For example, a user stack daemon (e.g., a daemon running TCP/IP stack) is hidden from the kernel because it is an agent located within user space. Additionally, the user stack daemon is also hidden from the user space application because it often provides functionality that requires special access permissions, etc. Accordingly, user space networking creates the unusual problem that the kernel may "kill" a properly functioning user stack daemon if the daemon appears to be leaking memory (i.e., is corrupted).

For example, in the context of TCP/IP operation, the packet retransmission memory is handled by a user stack daemon. TCP/IP requires ordered packet delivery to the application. If a packet is received out-of-order (i.e., packets were lost), the correctly received TCP/IP packets are held internally until the missing packets that complete the ordered set of packets, are retransmitted and received. Once the entire sequence is received (or a portion of the sequence that is otherwise in order), it can be provided to (or received from) the user space application. The storing of correctly received but out-of-order TCP/IP packets may "grow" depending on network conditions. Under certain situations, this could appear as a memory leak, resulting in the killing of that ongoing TCP/IP process.

Figure 10:
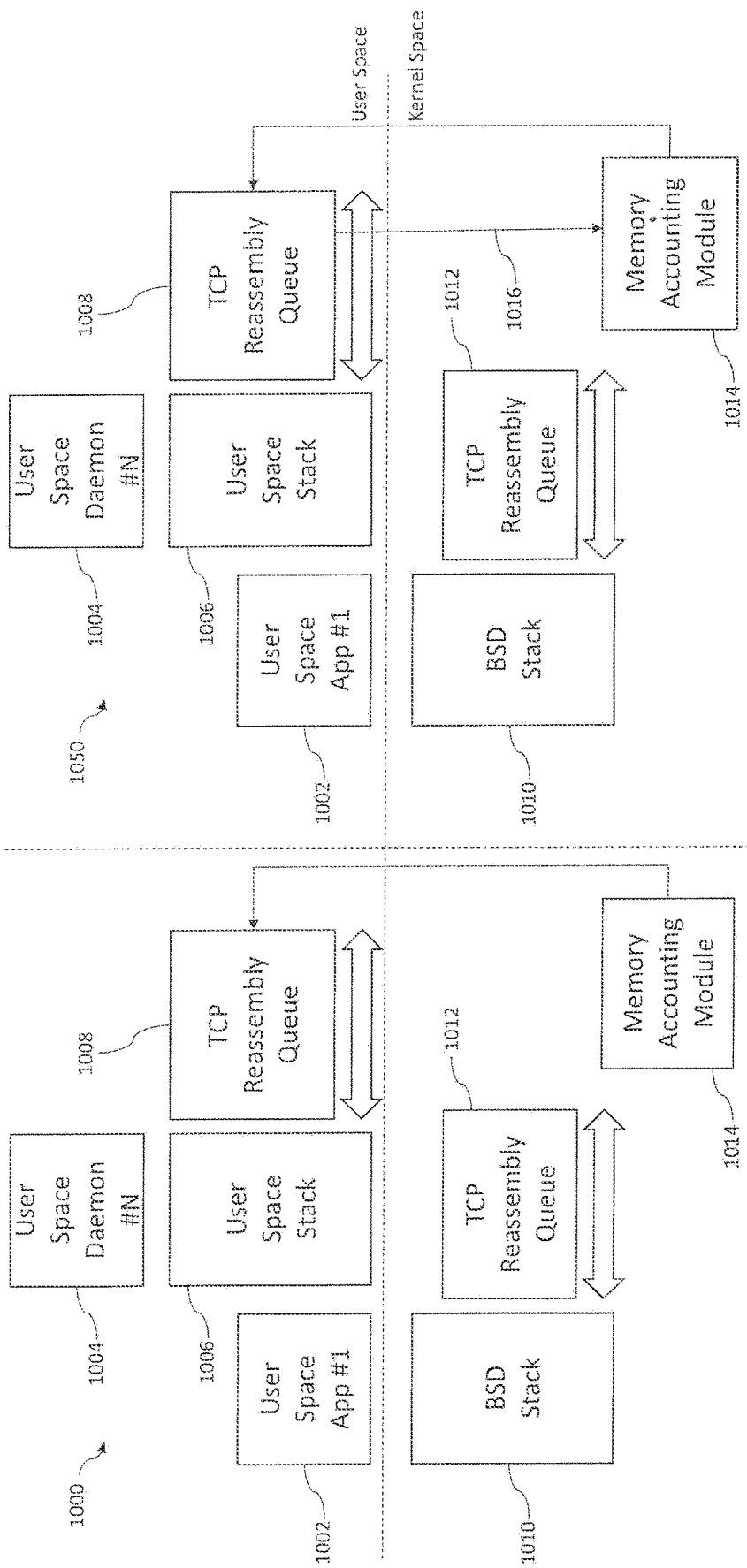
FIG. 10A is a logical block diagram illustrating problematic operation for user space communication stacks, in accordance with various aspects of the present disclosure.
FIG. 10B is a logical block diagram illustrating an exemplary solution to the problematic operation of user space communication stacks, in accordance with various aspects of the present disclosure.

FIG. 10A illustrates problematic operation and exemplary operation for user space communication stacks 1006, while FIG. 10B illustrates an exemplary solution to the problematic operation of user space communication stacks 1006. In FIG. 10A, one exemplary system 1000 includes two exemplary user space applications 1002, 1004. User application #1 1002 includes a legacy BSD stack 1010 that operates in kernel space (provided for reference); while daemon #N includes a user space communications stack 1006. The legacy BSD stack 1010 includes a TCP reassembly queue 1012 that is also present in kernel space; while the user space communications stack 1006 includes a TCP reassembly queue 1008 that is present within user space. A memory accounting module 1014 operating in kernel space is utilized to determine potential memory leaks within the daemon 1004.

As shown in FIG. 10A, the TCP/IP daemon's reassembly queue 1008 can grow in user space, this can look like a runaway process for the memory accounting module 1014. The TCP reassembly queue 1008 includes a user space segment allocator for memory. The segment based allocator tracks memory requests for e.g., the TCP/IP daemon (associated with the TCP reassembly queue 1008). However, because the TCP/IP daemon operates in user space, the memory accounting module 1014 operating in kernel space may "kill" the daemon should the TCP reassembly queue 1008 exceed a threshold size. In other words, the memory accounting module 1014 may decide to "prune" the memory allocation for the TCP reassembly queue 1008 associated with user space daemon #N 1004. In other words, a sudden growth in TCP reassembly queue caused by active use in poor network conditions could be mistaken for a memory leak by the kernel.

For reference, the TCP reassembly queue 1012 associated with the legacy BSD stack 1010 during poor network conditions would expand, and exceed a runaway process threshold.

FIG. 10B illustrates a system 1050 that implements a solution to the problem introduced by the introduction of user space communications stacks 1006. The TCP/IP daemon's reassembly queue 1008 may indicate to the memory accounting module 1014 that the user space communication stack 1006 is active (or inactive). In instances where the signaling 1016 is indicative of an active user space communications stack 1006, the memory accounting module 1014 may allow the process to continue despite, for example, the TCP reassembly queue exceeding its memory allocation.

In another embodiment, the segment based allocator for user space memory may use virtually identical software (e.g., with application specific modifications) of the kernel based segment allocator associated with legacy BSD stacks 1010 to user space TCP/IP. In other words, a second instance of the segment allocator (the first instance being located in kernel space) may perform the same memory tracking (e.g., arena-region-segment-object type memory tracking) for the user space TCP/IP process. The second instance may have a "virtual" amount of memory that it requests to be backed by physical memory (if necessary). Unlike the traditional kernel based malloc (the generic memory leak killer de-allocator), the user space segment allocator may be tailored specifically for the TCP/IP application considerations. For example, the user space segment allocator can be set with active/inactive thresholds (via signaling 1016) that are based on TCP/IP protocols, and/or allocate user space buffers based on TCP/IP packet size (e.g., 1500 byte packets, etc.).

In some implementations, a TCP/IP process may request user space buffers when packet retransmission is required. The segment based allocator may request a segment from the kernel, resulting in the generation of a number of user space buffers. These user space buffers may be provided to the TCP/IP daemon. If the memory allocation associated with these user space buffers crosses a threshold value (i.e., where they would be in danger of being pruned), the segment based allocator notifies the kernel that the user process is active via signaling 1016. This signaling 1016 indicates to the memory accounting module 1014 that these user space buffers should not be pruned unless the TCP reassembly queue appears to be in a runaway active process. The segment based allocator may also notify the kernel if it is inactive via signaling 1016. Accordingly, the memory accounting module 1014 may establish a different threshold value as compared with the threshold value associated with active processes. In some implementations, the threshold value for an inactive process will be lower than a threshold value for an active process. In other words, the pruning is not disabled, rather different metrics may be utilized in order to determine whether the process is "runaway".

While the prior discussion focused mainly on TCP/IP retransmission, it would be readily understood by one of ordinary skill given the contents of the present disclosure that the foregoing discussion may be readily applied to any memory allocation/deallocation system that may take into consideration active/inactive thresholding.

Other TCP Specific Considerations—

TCP presents specific problems for traditional "defunct" Channel I/O (see e.g., co-owned U.S. patent application Ser. No. 16/146,916 filed Sep. 28, 2018 and entitled "Methods and Apparatus for Channel Defunct Within User Space Stack Architectures", the contents of which were previously incorporated herein by reference supra). As a brief aside, during normal TCP operation, TCP packets are received and re-ordered. The TCP packet headers are checked in order to ensure that the received TCP packets are ordered correctly.

In other words, since the TCP packets are stored in the channel space, defuncting a channel I/O may result in data inconsistencies (and/or unknown states) in the user space TCP check logic (due to the memory mapping redirection to zero-filled pages); instead of triggering a graceful termination, the user space networking stack could wrongly trigger retransmission attempts or other undesirable data handling.

In one exemplary embodiment, in order to avoid data inconsistency issues when a channel is defunct, the user space networking stack copies the original TCP header into stack/heap memory (which is not part of the channel allocation), before TCP processing begins for the packet. After copying the header, user space TCP checks if the channel is defunct. If the channel did not defunct, then the copied TCP header is deemed valid. Once TCP processing begins, the user networking stack can use the copy of the TCP header to make decisions (thereby preventing undesirable behavior).

Additionally, in some cases, various embodiments also prevent data corruption to higher layers above TCP. For example, if the data contains zeroes due to memory redirection, then the data is not forwarded on. Instead, after the copy step (from channel buffer to application buffer), user space TCP checks to see if the channel is defunct and if so indicates that the connection is disconnected (so that data can be thrown away).

More generally, while the foregoing process is described within the context of TCP, artisans of ordinary skill in the related arts will readily appreciate, given the contents of the present disclosure, that substantially similar techniques could be used on any dedicated logic (which would not recognize the aforementioned invalid data).

In other words, using the channel memory after defunct could lead to data inconsistencies in user space TCP. To avoid data inconsistency issues when a channel is defunct during processing of TCP packet, various embodiments make a shadow copy of the original TCP header in stack/heap memory. Once TCP processing begins, it uses the copy of the TCP header to make decisions which prevents any inconsistency or data corruption. The validation is done prior to handing off the payload data to the layer above TCP, as well as within the TCP input processing paths.

Figure 11:
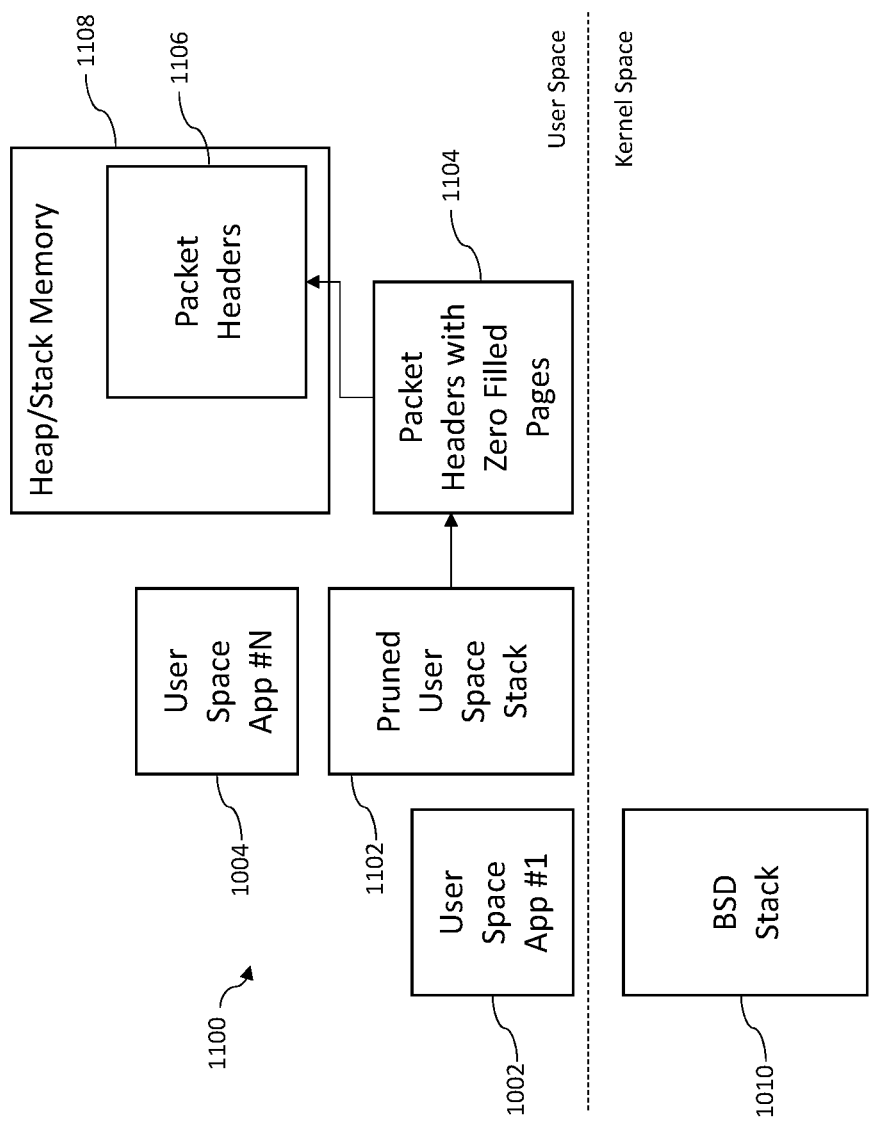
FIG. 11 is a logical block representation illustrating an exemplary operating scenario that has been generalized to any sort of control plane data, in accordance with various aspects of the present disclosure.

FIG. 11 is a logical block representation illustrating an exemplary operating scenario that has been generalized to any sort of control plane data (e.g., TCP/IP packet headers). FIG. 11 illustrates an exemplary legacy BSD stack 1010 associated with user space application #1 1002 that operates in conjunction with user space application #N 1004 that possesses its own user space communications stack 1102. While legacy BSD is shown being utilized in conjunction with user space communications stacks, it would be readily apparent to one of ordinary skill given the contents of the present disclosure that the legacy BSD stack 1010 is not required for the operation of the system 1100.

As a brief aside, the terms "foreground" and "background" as used herein, refer to the priority assigned to programs running in, for example, a multitasking computing environment. For example, foreground applications are applications that a user is currently interacting with (e.g., viewing, providing input to, etc.), while background applications are applications that a user is not currently interacting or where portions of the application have otherwise been suspended. As used herein, the term "suspended" within the present context refers to an application or process in which the given application or process may be removed from main memory and placed into bulk storage.

Referring back to FIG. 11, when user space application #N 1004 is moved into the background, after previously being placed into the foreground, the user space communications stack 1102 may be pruned so as to, inter alia, free up memory resources. In such a scenario, the control plane data associated with the pruned user space communication stack 1102 (e.g., the channel has been defuncted as is described in co-owned U.S. patent application Ser. No. 16/146,916 filed Sep. 28, 2018 and entitled "Methods and Apparatus for Channel Defunct Within User Space Stack Architectures", the contents of which were previously incorporated herein by reference supra) and the control plane packet headers are checked, the control plane payload data is filled with null data 1104 (e.g., zero-filled pages) and the control plane packet header is copied 1106 into heap/stack memory 1108. As described supra, heap/stack memory 1108 is not part of the channel allocation.

Subsequent user space control plane operations will now reference the copied control plane packet header information 1106 in heap/stack memory 1108. When the user space application #N 1004 is resumed (i.e., moved back to the foreground), the user space process resumes operation in the defuncted, for example, user space TCP/IP stack. The pruned user space communication stack 1102 will see a network connectivity error as a result of the null data (e.g., zero-filled pages, etc.) and/or a channel schema flag and the pruned user space communication stack 1102 restarts as the connectivity is assumed to be lost and that all of the local information will be assumed to be stale. In some implementations, the pruned user space communications stack 1102 does not check the channel schema, and will instead rely on detection of the null data and e.g., the appropriate TCP/IP header information. These and other variants would be readily apparent to one of ordinary skill given the contents of the present disclosure.

Reaping Based on Heuristics—

In-kernel network stacks juggle many different threads simultaneously for the entire system, each having different levels of priority. Historically, it has been unfeasible to identify particular threads which are idle or underutilized in a traditional network stack. Consequently, in-kernel resource management (i.e., "inline in data path") suffers from lock ordering issues and/or performance loss due to exclusive locks.

In contrast, a user space network stack only services a single thread, thus a user space networking stack can easily identify if its resources are being squandered. Moreover, even where the user space networking stack incorrectly reaps its resources, the resulting performance loss is isolated to itself; it will not affect other stacks or drivers.

In one exemplary embodiment, a user networking stack monitors a number of parameters and/or other heuristics to determine whether or not the connection is idle. Common examples of such heuristics may include time alive, time waiting, buffering data, last time active, historic use, predicted use, and/or any other predictive or probabilistic scheme to identify when to reap a process.

It is appreciated that aggressive reaping methods may be used to improve performance up to a point; thereafter overly aggressive reaping may be detrimental. More directly, from a holistic system view, each of the user space networking stacks is associated with its own unique memory pools per channel and/or per device driver. Each of which has different performance requirements. For example, a cellular driver and an Ethernet driver each have different requirements and/or costs of loss (e.g., Ethernet typically has higher runtime data rates compared to cellular, and thus a larger memory pool). Consequently, the aggressiveness or conservativeness of process reaping may be fine-tuned based on the type of application or driver and/or other application specific criteria.

In other words, efficiently and aggressively pruning and purging of idle resources is needed. Various disclosed embodiments include mechanisms which can detect idle resources and can offload pruning and purging of these resources in a deferred context.

Figure 12:
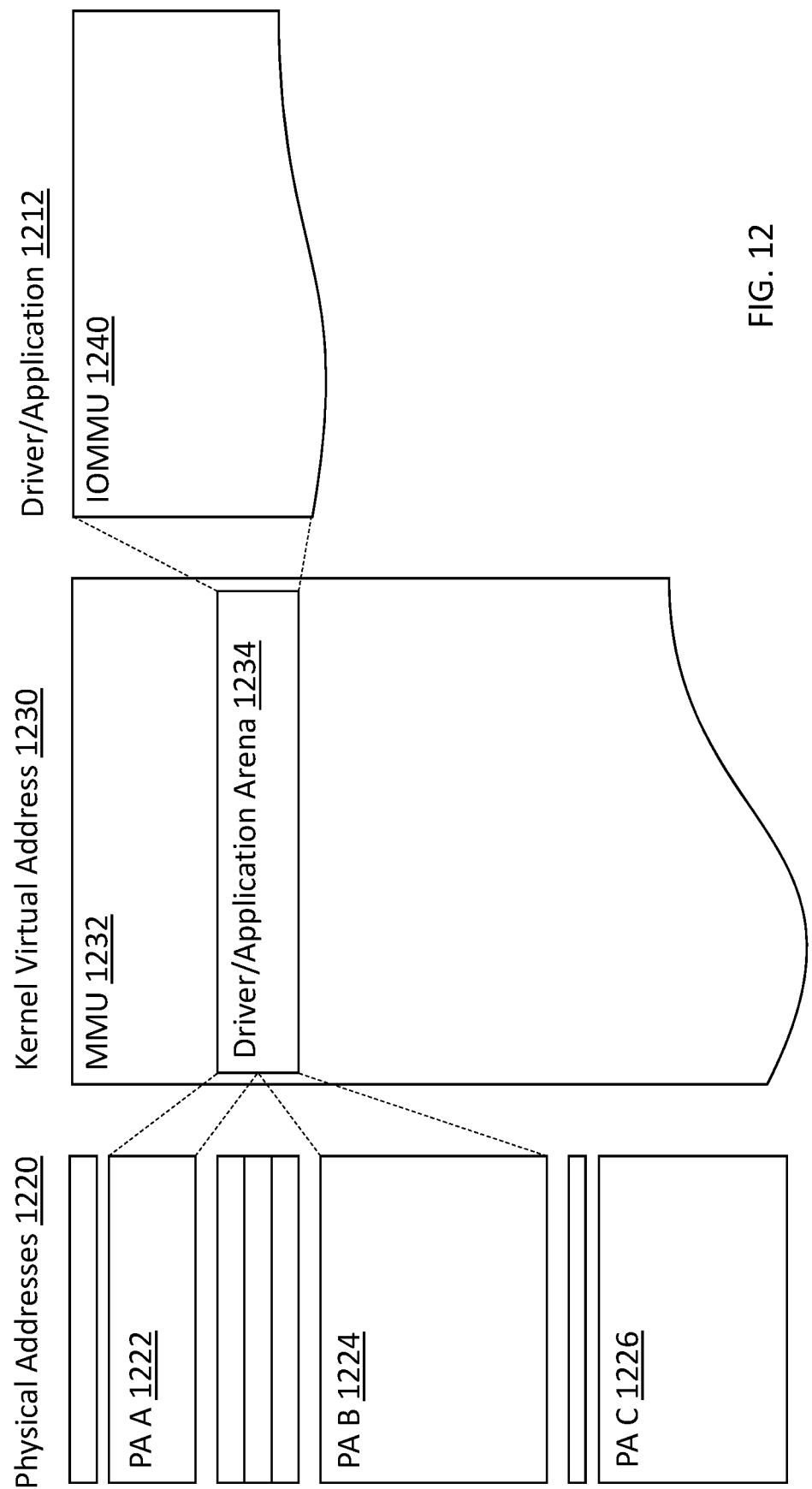
FIG. 12 is a logical block diagram of an exemplary implementation of a packet pool for a non-kernel space application, in accordance with various aspects of the present disclosure.

Referring to FIG. 12, a driver (or application) 1212 may be allocated an input-output memory management unit (IOMMU) 1240. In some variants, the IOMMU 1240 or a portion thereof may be required to be wired (i.e., backed with physical pages). As a brief aside, many drivers may read/write to memory independently of the operating system (i.e., the O/S cannot swap back the memory). Traditionally speaking, an IOMMU is a type of memory management unit (MMU) that connects a DMA-capable I/O bus to physical addresses within memory. However, in the context of the present disclosure, the IOMMU 1240 for, for example, a driver (or application) 1212 is only capable of accessing a virtual address space (e.g., a driver (or application) arena 1234) within the system MMU 1232, based on a kernel virtual address (KVA) 1230. While a single driver arena 1234 is illustrated in FIG. 12, it would be readily apparent to one of ordinary skill given the contents of the present disclosure that two or more driver arenas may be allocated to the driver (or application) 1212 (via the IOMMU 1240). In some implementations, from the perspective of the driver (or application) 1212, the driver (or application) is allocated a contiguous block of memory within the MMU 1232.

The KVA 1230 provides the necessary translation between a virtual address space within the driver/application arena 1234 and physical addresses 1220 in memory. For example, as illustrated in FIG. 12, the driver/application arena 1234 within the KVA 1230, points to two contiguous physical address spaces in memory (i.e., physical address space A 1222 and physical address space B 1224). Physical address space A 1222 may constitute "wired" memory, while physical address B 1224 may constitute purgeable memory. Accordingly, if driver/application 1212 doesn't require the full amount of memory allocated in its driver/application arena 1234, the KVA 1230 may deallocate physical address B 1224. If the driver/application 1212 subsequently requires additional memory, the KVA 1230 may reallocate physical address B 1224, or may even allocate to another physical address space (e.g., physical address C 1226). These and other variants would be readily apparent to one of ordinary skill given the contents of the present disclosure.

Figure 13:
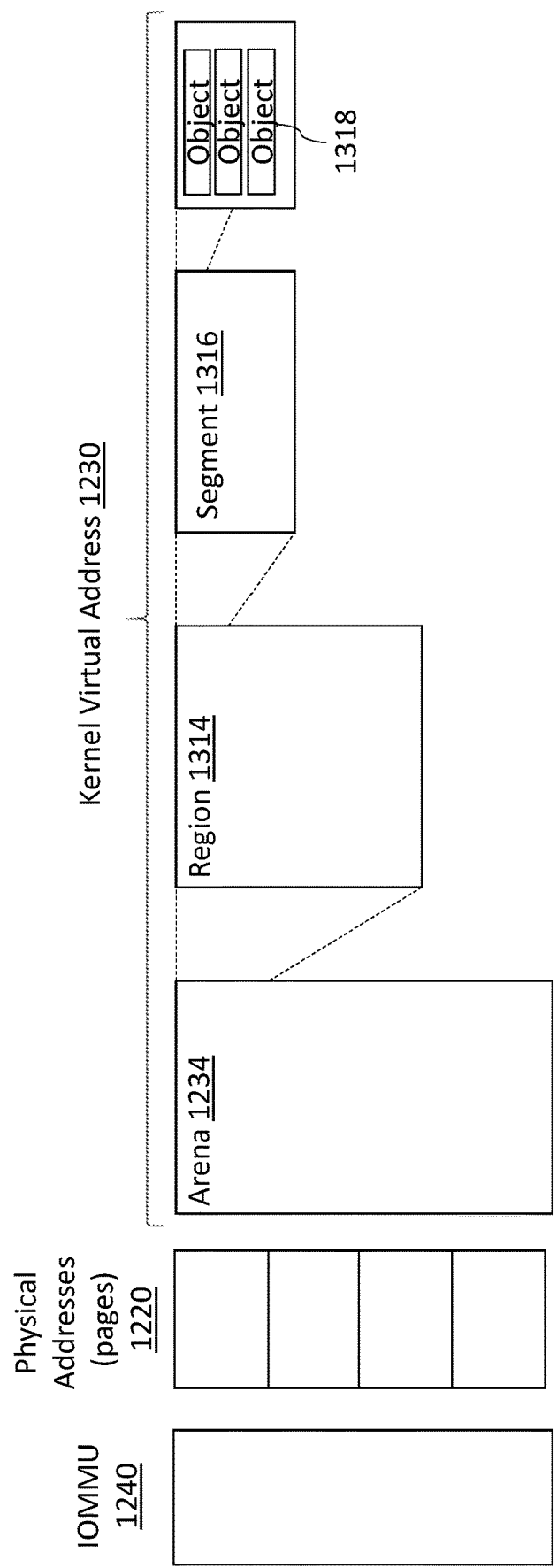
FIG. 13 is a logical representation illustrating an exemplary kernel virtual address allocation, in accordance with various aspects of the present disclosure.

As shown in FIG. 13, a driver/application arena 1234 is subdivided into a plurality of regions 1314, each region 1314 is further sub-divided into a plurality of segments 1316, and each segment is sub-divided into a plurality of objects 1318. During an initial channel allocation, the channel may be allocated objects 1318 to hold packet buffers. However, at any given time, the driver/application may not use all of its assigned packet buffers, thus these unused packet buffers can be purged to make more space to other drivers/applications. In legacy BSD operation, these packet buffers could be purged/reallocated on demand without significant penalty. In other words, a single packet buffer could be freed and immediately re-allocated without incurring significant additional costs. However, in the context of user space communication stacks as is described within the present disclosure, the freeing/reallocating of objects 1318, segments 1316, regions 1314 and/or arenas 1234 may result in unnecessary memory churn.

This unnecessary memory churn is resultant from, for example, context switching (as described elsewhere herein), between user space and kernel space. For example, one exemplary example of memory churn occurs when utilizing a transmission buffer to send a packet to be transmitted. Once the packet has been sent, the transmission buffer can then be freed (in user space) and re-allocated to a receive packet buffer to receive a receive packet by a kernel process. Such a deallocation/reallocation, when performed on demand can be computationally expensive due to, for example, the aforementioned context switching. Accordingly, in some implementations, channel allocations (with a corresponding arena 1234, regions 1314, segments 1316 and objects 1318) may be freed or reaped based on idleness and deferred when possible so as to minimize unnecessary memory churn.

For example, freeing could occur based on a freed segment 1316, or its constituent objects 1318. When and object 1318 or segment 1316 is freed, then the backing memory (e.g., the physical addresses/pages 1220) can be freed in the kernel. However, this freeing of the backup memory 1220 may occur on a deferred context basis. For example, the deferred context may occur upon the expiration of a timer with the freeing of the backup memory 1220 occurring on a batch basis. As but yet another example, the deferred context may occur upon a context switch that has otherwise been initiated for a purpose other than for the primary purpose of freeing backup memory 1220. The use of a deferred context avoids unnecessary allocation/deallocation memory churn. For example, consider a freed transmission packet buffer that waits for the deferred context timer to expire. Once this timer expires, the freed transmission packet buffer can be deallocated in physical memory 1220. If a new use is available to be allocated (e.g., for use as a receive packet buffer), this freed transmission packet buffer can be reallocated. These and other variants would be readily apparent to one of ordinary skill given the contents of the present disclosure.

Purgeable Memory (Compressible and Swappable)—

The networking memory requirement on, for example, an iOS device can be significant. Existing architectures needs all of the memory to be wired, which reduces the system's ability to recover under memory pressure as the memory cannot be swapped or compressed. In a traditional BSD stack, the entire kernel address was "wired". So-called wired memory is always present at the same physical (and virtual) memory address, it is never purgeable, and the wiring of this memory has traditionally occurred on a "segment" basis. However, by placement of these traditional BSD stacks into user space and allocating a given user space application its own user space communications stack, wiring memory for each of these user space communication stacks has become extremely memory intensive and expensive. In fact, dependent upon the number of user space communications stacks implemented, wiring each of these user space communications stacks may even be considered impossible to implement.

Referring back to FIG. 13, and in one exemplary embodiment, the user space network stack infrastructure architecture allocates all memory as "purgeable" and only wires memory on demand when needed. In some implementations, a user space networking stack can instantiate multiple stacks in purgeable user space. Drivers may need to DMA (and may require and IOMMU 1240); consequently, driver allocations may be wired down on an as-needed basis.

So-called purgeable memory is memory that may or may not have a physical backing page 1220 in memory. If the physical backing page 1220 can be purged, the contents of this purged memory may be compressed and moved to, for example, long term storage (e.g., a hard disk drive or other non-volatile memory storage device). However, the KVA 1230 may be maintained, even though the virtual address in the KVA 1230 is no longer backed up by a physical address 1220. When the contents of this purged memory are needed again, the compressed memory may be uncompressed and placed back into a physical memory address 1220. Although the physical memory address 1220 may have (and likely would have) changed, the virtual memory address in the KVA 1230 may remain the same. In other words, in some implementations, purgeable data may always be accessible via the same virtual address even though the physical page 1220 that backs the virtual address may have changed. Notably, DMA always requires wired memory, within the purgeable memory space, because the device may access the memory even when, for example, a processor may not necessarily be made aware of the access.

Memory Region/Arena: Purpose, Layout, Access Protection, Sharing Model—

An efficient and generic mechanism to represent and manage the shared memory objects of varying types and sizes which are memory mapped to the user space and/or kernel space is needed. The traditional BSD stack only offered a single generic interface, also known as a socket. However, by providing multiple user space communications stacks, more granularity and tweaks to the behavior of the user space communication stack may be better optimized for the application that it serves.

In one embodiment, the user space network stack infrastructure architecture uses shared memory for efficient packet I/O, network statistics and system attributes (sysctl). The user space network stack infrastructure arena is a generic and efficient mechanism to represent these various types of shared memory subsystems and their backing memory caches, regions and access protection attributes. Channel schema is a representation of the shared memory layout for user space process to be able to efficiently access various channel objects.

Figure 14:
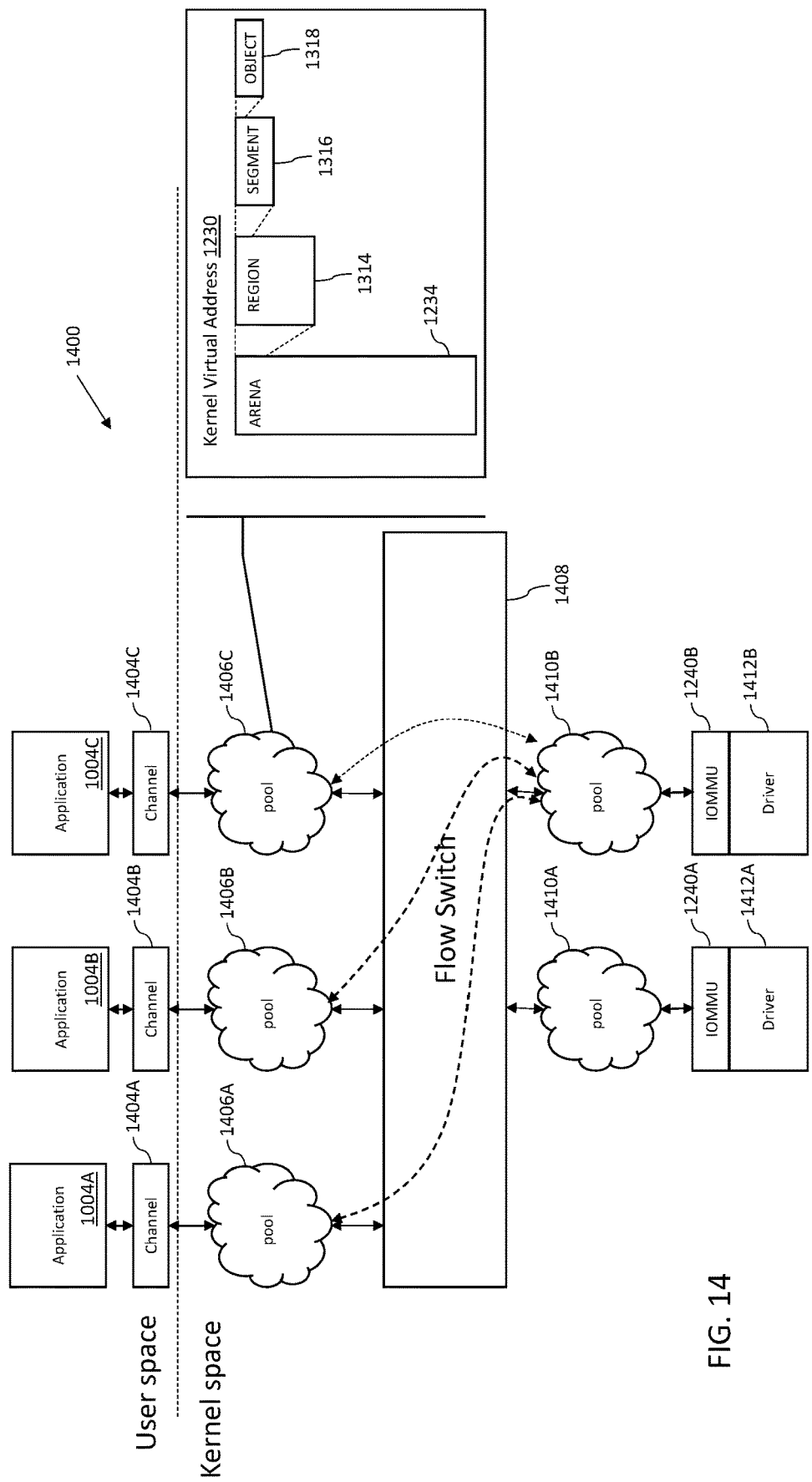
FIG. 14 is a logical block diagram of an exemplary system for implementing the various methodologies described herein, in accordance with various aspects of the present disclosure.

A plurality of differing pre-set channel schemas may be established that are dependent upon a given application's desired mode of operation. A channel schema may be thought of as a memory sharing agreement between the kernel space and user space, also referred to as a "shared memory area". Referring now to FIG. 14, one exemplary implementation for a system 1400 for use in accordance with embodiments of the present disclosure is now shown and described in detail. The system 1400 may take on any number of electronic device forms including, without limitation, a desktop computer, a laptop computer, a tablet, a smart phone, an audio/visual computer, smart wearable devices, and other computerized devices. For example, the system 1000 may be embodied within any of the Assignee's products (e.g., MacBook®, iMac®, iPad®, Apple Watch®, Apple TV® and iPhone®, etc.).

This exemplary system 1400 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described herein. Moreover, while a specific architecture is shown in FIG. 14, it would be readily apparent to one of ordinary skill given the contents of the present disclosure that the illustrated topology shown in, for example, FIG. 14 may be readily modified to include one or more applications 1004, one or more channels 1404, one or more pool of resources 1406 associated with a respective application, one or more flow switches 1408, one or more pool of resources 1410 managed by, for example, one or more drivers 1412. These and other variants would be readily understood by one or ordinary skill given the contents of the present disclosure with the illustration contained within FIG. 14 merely being exemplary.

FIG. 14 illustrates three applications 1004A, 1004B, and 1004C that reside within user space. One or more of these applications 1004A, 1004B, and 1004C may include its own communications stack as is described in additional detail supra. Each of these applications 1004A, 1004B, and 1004C may further communicate with the kernel space through respective channels 1404A, 1404B, and 1404C which are coupled with a respective pool of dedicated resources 1406A, 1406B, and 1406C. Some (or all) of the data resident within these pools of dedicated resources 1406A, 1406B, and 1406C may be communicated to managed pools of resources 1410A, 1410B via a flow switch apparatus 1408. Each of applications 1004A, 1004B, 1004C may operate in accordance with a unique channel schema.

In one exemplary embodiment, the flow switch 1408 apparatus is responsible for transferring data between pools 1406 and pools 1410. In some implementations, the flow switch apparatus 1408 may read data from one pool resource (e.g., pool 1406A) and write this data to another pool resource (e.g., pool 1410B) and vice versa. As an alternative implementation, the flow switch apparatus may redirect a pointer so as to enable data to be transferred from one pool resource (e.g., pool 1410B) to another pool resource (e.g., pool 1406A) and vice versa. In some variants, this data may be compressed prior to transfer and decompressed prior to being read and/or may be encrypted prior to transfer and decrypted prior to being read. These and other variants would be readily apparent to one of ordinary skill given the contents of the present disclosure.

Each driver 1412A, 1412B may be assigned (or otherwise possess), its own respective IOMMU 1240A, 1240B. Each IOMMU 1240A, 1240B may communicate with an MMU (1232, FIG. 12) associated with the kernel virtual address 1230. Each driver 1412A, 1412B may be assigned an arena 1234, which is composed of regions 1314. Each region 1314 may be further sub-divided by segments (or slabs) 1316. Within each segment (or slab) 1316 may be one or more objects 1318. While the present disclosure is presented in the context of one packet pool scheme, others may be substituted with equivalent success. More directly, any comparable data structure may be substituted with the arena, region, segment, object being merely exemplary.

Each packet pool (pool of resources) 1406A, 1406B, 1406C may have distinct properties from other ones of the packet pools (or pools of resources). For example, latency and/or throughput may be correlated as a function of segment size. Additionally, the ability to flexibly adjust the size of the arena 1234, the region 1314, the segment 1316, and the objects 1318 in order to allocate (or deallocate) memory resources may be dependent upon the sizing for these respective elements. For example, a segment 1316 may only be freed (e.g., re-allocated), once all the objects 1318 within the segment 1316 have been freed. In other words, a single packet located within an object 1318 (and segment 1316) may not have yet been successfully sent, and accordingly, this single packet may prevent an entire segment 1316 from being reclaimed. Similarly, all segments 1316 must be freed for a region 1314 to be freed (e.g., re-allocated), and all regions 1314 must be freed for an arena 1234 to be freed (e.g., re-allocated).

A given channel 1404 may request a schema from the nexus. Multiple channel schemas are possible with each of these multiple channel schemas having different configurations and policies. Each channel schema may be thought of as a memory sharing agreement between the kernel and user space. This memory sharing agreement results in the creation of a shared memory area. Each shared memory area may be pre-divided into a number of data structures that may include a transmission buffer (e.g., a TX ring buffer), a receive buffer (e.g., a RX ring buffer), an allocation buffer (e.g., an "alloc" ring buffer), and a free buffer (e.g., a free ring buffer). Each of these buffers is described in co-owned and co-pending U.S. patent application Ser. No. 16/363,495 filed Mar. 25, 2019 and entitled "Methods and Apparatus for Dynamic Packet Pool Configuration in Networking Stack Infrastructures", the contents of which being incorporated herein by reference in its entirety. Each of these buffers may be individually configurable dependent upon application 1004 requirements. For example, in the context of ring buffers (e.g., TX, RX, 'alloc', and free), a shorter/smaller ring size may have faster latency response, but may also have smaller amount of data throughput. Conversely, a longer/larger ring size may have slower latency response, but may also have a higher amount of data throughput. Intermediate ring sizes may balance latency and throughput dependent upon the application 1004 requirements.

Each schema may include optimized flow advisor settings, as well as differing operating statistics. A given schema may have a number of different size allocations for the arena 1234, individual regions 1314, individual segments 1316 and individual objects 1318. Each of these size allocations may be optimized for a given application 1004. Additionally, memory offsets, access rights (e.g., read/write permissions) and other memory considerations may be selected for a given channel schema. In addition to pre-set schemas that may be requested (or given) to a given application 1004, in some implementations, an application 1004 may request a custom setting for the pre-selected channel schema chosen. The nexus may have different priorities in place in order to determine whether to grant, deny, or modify a given custom setting request. For example, an allocated schema may be different than the channel's request for a schema (e.g., as a result of not having enough memory resources). Conversely, an allocated schema may be the same as that requested by the channel 1404. In some implementations, the allocated schema may include a continuous channel allocation (e.g., a continuous allocation of virtual addresses within the kernel virtual address 1230). Such variants may have advantages in terms of memory management complexity. Conversely, in some implementations, the allocated schema may include a non-contiguous channel allocation. This non-contiguous channel allocation may allow, for example, a developer of an application 1004 to grow individual regions separately (e.g., the ring buffer sizes may be dynamically changed separate from the rest of the memory allocations in the channel schema, etc.). Some implementations may implement versioning support for various pre-selected channel schemas. Accordingly, a developer may develop an application 1004 that is intended to operate in accordance with a given schema, but may later further develop the application 1004 to support a newer version of the given schema. These and other variants would be readily apparent to one of ordinary skill given the contents of the present disclosure.

Mirrored Memory Regions—

To implement security validation and sanitation of shared memory objects on the user-kernel boundary, kernel checks a kernel only copy of these objects. Improved methods for allocating and retrieving these objects are needed.

In one embodiment, the system creates mirrored memory objects which share the same region offset as that of the associated object and hence can be retrieved quickly from the attributes of the associated object.

As a brief aside, implementation of communication stacks within the user space as is described elsewhere herein may introduce unique security vulnerabilities. For example, a so-called "TOCTOU" attack is a class of software bugs that are caused by differences between the "Time of Check" (TOC) and the "Time of Use" (TOU) of data. Traditionally, a kernel process would check user data before use, in order to ensure that the data was valid (or "clean"). For various reasons, there may be a gap in time between the TOC and the TOU. Accordingly, in a TOCTOU attack, an attacker may repeatedly write a malicious value to the user data. Although the kernel process would catch most of these malicious writes, eventually a malicious write may hit the gap between the TOC and the TOU. This may be particularly problematic where each user stack process creates the network packets themselves (as is described elsewhere herein). For example, a malicious attacker may use a TOCTOU attack to write a malformed packet in order to, e.g., access the kernel process or otherwise attack another network entity. More directly, since networking stacks (e.g., TCP/IP) are in user space in implementations of the present disclosure, it is conceivable that packets may be generated that are not otherwise allowed from that particular TCP/IP instance. In other words, user space communication stacks may be susceptible to malicious activity and could generate packets that don't belong to a given source IP address/source port address, etc. The prevention of IP address/port spoofing is described in co-owned and co-pending U.S. patent application Ser. No. 16/146,324 filed Sep. 28, 2018 and entitled "Methods and Apparatus for Preventing Packet Spoofing with User Space Communication Stacks", the contents of which being incorporated herein by reference in its entirety.

Accordingly, security validation of data may be required such that the time of check and the time of use are not compromised in order to prevent against so-called TOCTOU attacks. This may entail the copying of data (e.g., packets) from user space to kernel space and vice versa. As a brief aside, when the user space application generates a packet, the kernel allocates and creates: a metadata kernel object (MDK), and a metadata user object (MDU). Initially, the MDU (written by the user space) may be copied into an MDK data structure. More directly, the user space only has access to the MDU, whereas the kernel space has access to both the MDU and MDK. The MDU and MDK are "parallel" but distinct objects; thus, only certain fields within the objects are transferred during a write from user space to kernel space (internalizing data from the MDU to the MDK) and reads from kernel space to user space (externalizing data from the MDK to the MDU). However, the MDK must be sanitized before it can be used in the kernel space at transaction.

As used herein, the term "sanitize", "sanitization", and/or "sanitizing" refers to a process of ensuring that data conforms to the privileges and/or requirements of the kernel and/or the user space. For example, when internalizing data from the MDU to the MDK, the data may be checked for appropriate formatting, validity, and/or malicious content (e.g., to avoid security and stability issues as discussed supra). Similarly, when externalizing data from the MDK to the MDU, the data may be checked to ensure that kernel private flags, values, and/or other sensitive information are not unintentionally exposed. If the MDK is successfully sanitized, then an optimized MDK may be generated from the sanitized MDK. For example, the MDK may be re-written to "naturally align" with the "natural word boundaries" of the processor cache. This sanitization process is described in further detail within co-owned and co-pending U.S. patent application Ser. No. 16/236,032 filed Dec. 28, 2018 and entitled "Methods and Apparatus for Classification of Flow Metadata with User Space Communication Stacks", the contents of which being incorporated herein by reference in its entirety.

Efficient memory allocation for MDU and MDK operation is a problem that is unique to the user space networking configuration of user space communication stacks and described elsewhere herein. Notably, searching through a table to identify empty memory allocations to support a MDU and MDK individually is inefficient. In other words, one would need to scan the entire memory for an arbitrary allocation of the MDU and MDK. Similarly, schemes based on referential data (e.g., if the MDU had a pointer to MDK), would necessarily require dereferencing the data from one to identify a location in the other (which would also be inefficient).

Figure 15:
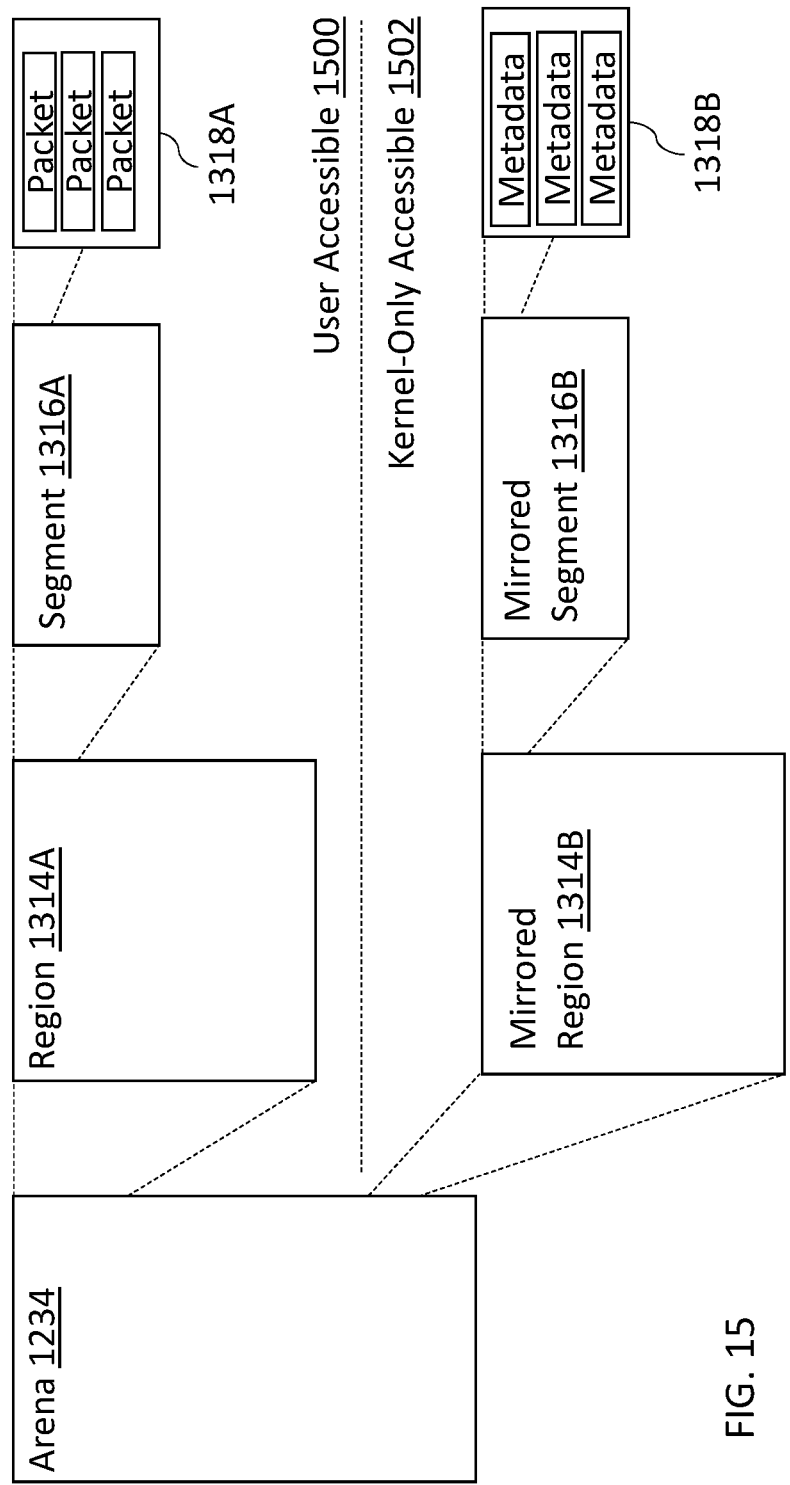
FIG. 15 is a logical representation of mirrored memory allocations, in accordance with various aspects of the present disclosure.

As shown in FIG. 15, a common offset from a base address for both the MDU and the MDK are used between the user-accessible region 1500 and the kernel-only accessible region 1502. As previously discussed above, the kernel may have access to both the user accessible region 1500 and kernel-only accessible region 1502, while user space applications would only have access to the user accessible region 1500. For example, one may use the same format and same offset (mirrored) between the region 1314A and the mirrored region 1314B. The same may also be applied between segment 1316A and the mirrored segment 1316B, and/or the object 1318A and the mirrored object 1318B. In other words, if the MDU address is known (offset+user base address), then the MDK address is the same offset (offset+kernel base address). The mirroring may always be synced, which aids in finding a new memory allocation (i.e., either the user space or the kernel space knows the memory spaces that are available in the other—each process can infer availability in the other from their mirrored memory map).

User Pipe Dynamic Memory Management Using Sync Stats—

Various embodiments of the user pipe nexus provide an efficient IPC between user space processes using shared memory. However, the number of processes using IPC on an iOS device can be significant. An efficient mechanism is needed to keep the shared memory usage to minimum without compromising on the data throughput.

In one embodiment, the system maintains a fair estimate of immediate memory usage of user (working set) depending on the recent past usage. User pipe nexus maintains a weighted moving average statistics of memory used during each sync and keeps adjusting the channel memory accordingly.

Methods—

Figure 16:
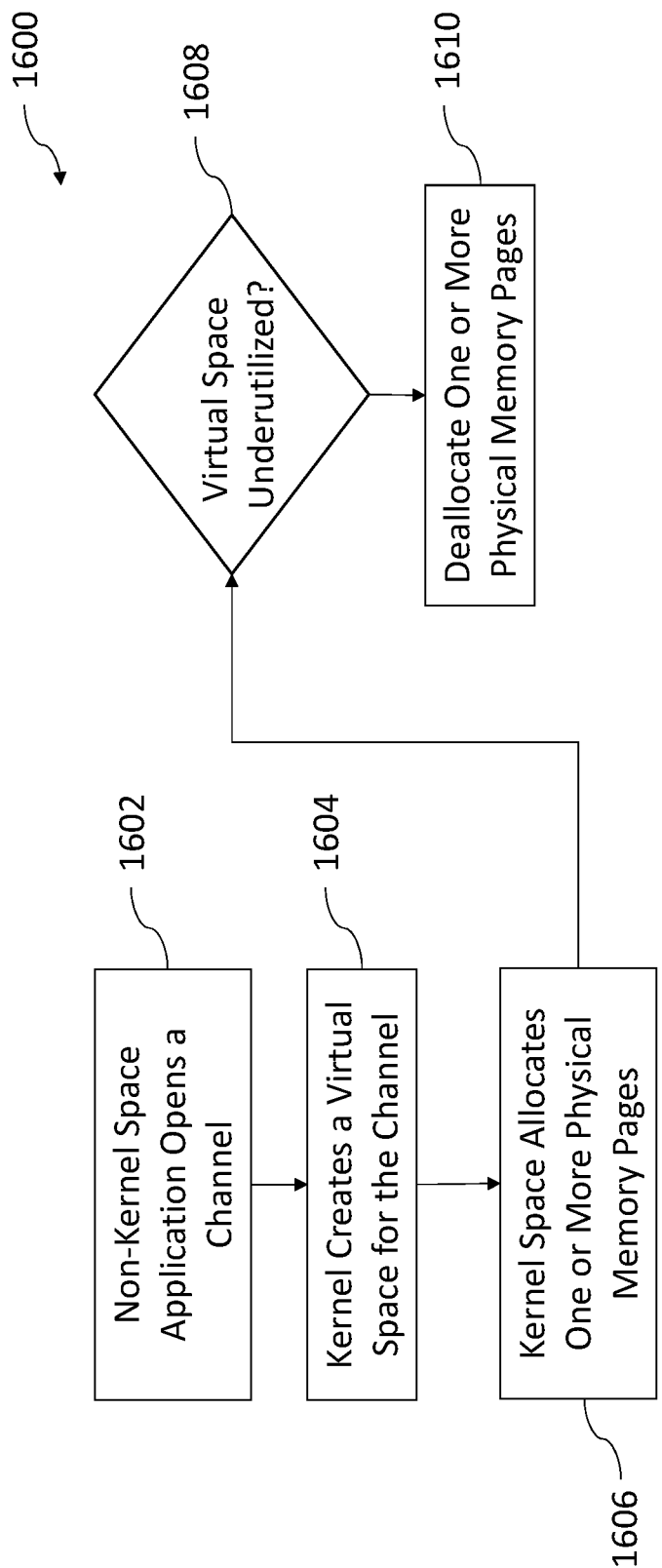
FIG. 16 is a generalized method for the allocation/deallocation of physical memory, in accordance with various aspects of the present disclosure.

FIG. 16 is a logical block diagram of a generalized method 1600 for allocating memory for channels and reclaiming memory from inactive/dead channels.

At step 1602 of the method 1600, a non-kernel space application opens a channel. In some implementations, the non-kernel space application is a user space application, while in other implementations; the non-kernel space application is a driver application. In one exemplary embodiment, the opening of the channel is associated with one or more application specific considerations. For example, these considerations may include, for example, those considerations described supra (e.g., see Memory region/arena: purpose, layout, access protection, sharing model—). In other words, the opening of the channel results in the non-kernel space application requesting (or being allocated) a channel schema. The channel schema can be selected from one of a plurality of different pre-designated channel schemas. In some variants, the channel schema chosen may be modified in response to requests made from the non-kernel space application. For example, the non-kernel space application may request modifications be made to a memory size for one or more of the arena, the region, the segment and/or the objects associated with the non-kernel space application. More generally, a channel may be established by a flow switch apparatus between two or more of devices, user accounts, applications, user space kernel space, driver space kernel space, user space driver space, other entities, and combinations of the foregoing.

At step 1604 of the method 1600, the kernel creates a virtual space for the channel established at step 1602. In one exemplary embodiment, the virtual space includes resources for communication via a network protocol. The network protocol may include, for example, TCP/IP. In one exemplary embodiment, the resources are a memory space. For example, the memory space may include a kernel virtual address space where the kernel virtual address space (or portions thereof), may be backed by physical addresses (pages) in memory at step 1606. In some implementations, these resources may also include buffer sizes, buffer types, access permissions and/or other types of channel statistics (e.g., latency and/or throughput). In some implementations, the channel schema may further define various address offsets. For example, one address offset may be taken from an absolute address. In some variants, the address offset may be taken from a relative base address.

In some implementations, the memory allocations are mirrored between user space and kernel space. See also, for example, Mirrored memory regions—described supra. In one exemplary embodiment, some portions of the virtual space may be "wired", while other portions may be "purgeable". As used herein, "wired" memory refers to memory allocations that are backed by actual physical memory; in contrast, "purgeable" memory refers to memory allocations that may be either actually present or virtually present (virtually present memory can be recalled from a larger backing memory, with a cache lookup penalty). In some implementations, the entirety of the virtual space may constitute purgeable memory.

At step 1606 of the method 1600, the kernel space allocates one or more physical memory pages to back at least a portion of the virtual space when the virtual space is in use. In some variants, memory allocations that are needed for the currently active user space stack are wired. In other variants, driver allocations are wired in addition to, or alternatively from, the currently active user space stack. In still other variants, some set of prioritized applications are wired. These prioritized applications may be determined based on prior usage, historical usage, and/or other determined metrics. In some implementations, use may be explicitly identified based on an "active" signaling. In one such variant, the active signaling may be based on a user space daemon. See also, for example, the discussion with regards to FIG. 10B described supra. In other embodiments, use may be implicitly determined based on metrics and/or other monitoring.

At step 1608 of the method 1600, the kernel space determines whether or not the virtual space is being underutilized and/or misused. For example, this determination may be made and implemented in accordance with the discussion surrounding FIG. 11 described supra. In some implementations, some portions of memory cannot be deallocated and hence, the determination made at step 1608 will be 'no'. For example, some portions of the virtual space may be required to be wired (i.e., always backed by physical memory).

In some implementations, memory use is tracked and dependent upon memory usage, the networking stack associated with a given application may be reclaimed (i.e., deallocated at step 1610). Memory usage may be identified using one or more statistics. In one example, when a user stack is idle, the user stack can be reclaimed at step 1610. In one variant, reclamation of the user stack may be reclaimed in accordance with a deferred context as is described supra. In other implementations, memory use is tracked and dependent upon results of runaway processing, and a determination of runaway processing may result in one or more physical memory pages being deallocated (e.g., reaped) at step 1610.

In some variants, some memory can never be deallocated. For example, in addition to the aforementioned wired memory, memory that is in active use by, for example, a TCP/IP process cannot be deallocated. In the context of TCP/IP processing, the deallocation of one or more physical memory pages may be restricted to the TCP/IP payload, while the TCP/IP header information may be stored in heap memory. See also the discussion with respect to FIG. 11 described supra. The storage of TCP/IP header information along with, for example, zero filled pages in heap memory may enable the device to see that the connection has been dropped in a controlled way.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A system for managing pools of resources, the system comprising:
   one or more processor apparatus;
   a plurality of user space applications executable by the one or more processor apparatus, wherein a user space application of the plurality of user space applications includes a user space communication stack;
   physical memory for use by the plurality of user space applications; and
   an input/output memory management unit (IOMMU) for use by the plurality of user space applications, the IOMMU managed by kernel space logic and configured to access a kernel virtual address (KVA), the KVA providing for translation of a virtual address accessed by the plurality of user space applications to a physical address associated with the physical memory;
   wherein the one or more processor apparatus are configured to:
      allocate a first virtual address space in the KVA to a first user space application of the plurality of user space applications, wherein at least a portion of the first virtual address space is used by a first user space communication stack included in the first user space application;
      associate the first virtual address space with a portion of the physical memory via use of the IOMMU; and
      based at least on a presence of an unused portion of the allocated first virtual address space, and one or more performance criteria associated with the first user space application, deallocate, from being allocated to the first user space application, a subset of the portion of the physical memory associated with the first virtual address space.

2. The system of claim 1, wherein the first virtual address space comprises an arena, the arena comprising a plurality of regions, each of the plurality of regions comprising a plurality of segments, each of the plurality of segments comprising a plurality of objects.

3. The system of claim 2, wherein the deallocated subset of the portion of the physical memory is associated with a first segment of the plurality of segments.

4. The system of claim 3, wherein the deallocation of the subset of the portion of the physical memory occurs in accordance with a deferred context, and the deferred context comprises an expiration of a timer.

5. The system of claim 3, wherein the deallocation of the subset of the portion of the physical memory occurs in accordance with a deferred context, and the deferred context comprises a context switch between user space and kernel space.

6. The system of claim 1, wherein the deallocation of the subset of the portion of the physical memory occurs responsive to signaling from a user process to a kernel process.

7. The system of claim 6, wherein the signaling from the user process to the kernel process is indicative that the first user space application is in an active state, the active state associated with an active threshold value.

8. The system of claim 7, wherein the signaling from the user process to the kernel process is indicative that the first user space application is in an inactive state, wherein the inactive state is associated with an inactive threshold value, and the inactive threshold value is lower than the active threshold value.

9. The system of claim 1, wherein the one or more processor apparatus are further configured to:
place the first user space application from a foreground process to a background process;
receive control plane packet data, the received control plane packet data comprised of control plane header data and control plane payload data;
replace the control plane payload data with null data; and
copy the null data and the control plane header data into heap memory.

10. The system of claim 9, wherein the one or more processor apparatus are further configured to:
read the null data and the control plane header data in the heap memory; and
resume network connectivity for the first user space application.

11. The system of claim 1, wherein the one or more performance criteria associated with the first user space application comprise one or more of: (i) one or more performance requirements associated with a type of data communication implemented by the first user space application, or (ii) a priority assigned to the first user space application.

12. A method for deallocating one or more physical memory pages from a kernel virtual address space, the method comprising:
assigning a first portion of the kernel virtual address space and a second portion of the kernel virtual address space to a first user space application and a second user space application, respectively, wherein a first part of the first portion of the kernel virtual address space is used by a first user space communication stack included in the first user space application, and a second part of the second portion of the kernel virtual address space is used by a second user space communication stack included in the second user space application;
backing the first portion of the kernel virtual address space and second portion of the kernel virtual address space with a corresponding first portion of physical memory and a corresponding second portion of physical memory;
determining that the first portion of the kernel virtual address space is underutilized; and
deallocating the first portion of the kernel virtual address space that is underutilized from the physical memory, the deallocating comprising reclaiming the first portion of the physical memory, and enabling assignment of the first portion to the second user space application.

13. The method of claim 12, wherein the deallocating of the first portion of the kernel virtual address space that is underutilized from the physical memory comprises compressing contents from the physical memory that is associated with the first portion of the kernel virtual address space that is underutilized; and
placing the compressed contents from the physical memory into a non-volatile memory storage device.

14. The method of claim 13, further comprising accessing the first portion of the virtual address space that has been deallocated, the accessing comprising decompressing the compressed contents in the non-volatile device; and
placing the decompressed contents in the non-volatile memory storage device into the physical memory.

15. The method of claim 14, wherein the placing of the decompressed contents in the non-volatile memory storage device into the physical memory comprises placing the decompressed contents into another area of the physical memory, while the accessing of the first portion of the virtual address space comprises using a same virtual address space addressing for the contents from the physical memory.

16. A system for managing pools of resources, the system comprising:
one or more processor apparatus;
one or more applications executable by the one or more processor apparatus;
physical memory for use by the one or more applications; and
an input/output memory management unit (IOMMU) for use by the one or more applications, the IOMMU configured to access a kernel virtual address (KVA), the KVA configured to provide translation of a virtual address accessed by the one or more applications to a physical address associated with the physical memory;
wherein at least one of the one or more processor apparatus is configured to:
allocate a virtual address space to one of the one or more applications;
associate the virtual address space with a portion of the physical memory via use of the IOMMU;
cause the one of the one or more applications to be placed from a foreground process to a background process;
receive control plane packet data, the received control plane packet data comprising first control plane data and second control plane data;
replace the second control plane data with null data;
copy the first control plane data into reference memory that is not associated with at least the virtual address space; and
deallocate a subset of the portion of the physical memory associated with the virtual address space.

17. The system of claim 16, wherein the deallocation is configured to enable reclaimed data associated with the deallocated subset of the portion of the physical memory to be replaced into another portion of the physical memory but accessible via the virtual address space.

18. The system of claim 16, wherein:
the IOMMU is associated with a corresponding driver, the corresponding driver comprising a performance requirement; and
the deallocation of the subset of the portion of the physical memory is based at least on the performance requirement.

19. The system of claim 16, wherein:
the KVA comprises a plurality of first sub-portions, each of the plurality of first sub-portions comprising a corresponding plurality of second sub-portions, the subset of the portion of the physical memory being associated with one or more of the plurality of first sub-portions; and
the deallocation of the subset of the portion of the physical memory occurs responsive to all of the corresponding plurality of second sub-portions being freed.

20. The system of claim 16, wherein the at least one of the one or more processor apparatus is further configured to, responsive to one or more subsequent control plane operations, read the copied first control plane data in the reference memory, the reference memory comprising heap memory, at least one of the one or more subsequent control plane operations comprising placement of the one of the one or more applications to the foreground process from the background process.

* * * * *